May 30, 1939.  R. N. CUNDALL  2,160,059
APPARATUS FOR CLOSING, SEWING, AND SEALING BAGS
Filed Nov. 2, 1932  14 Sheets-Sheet 1
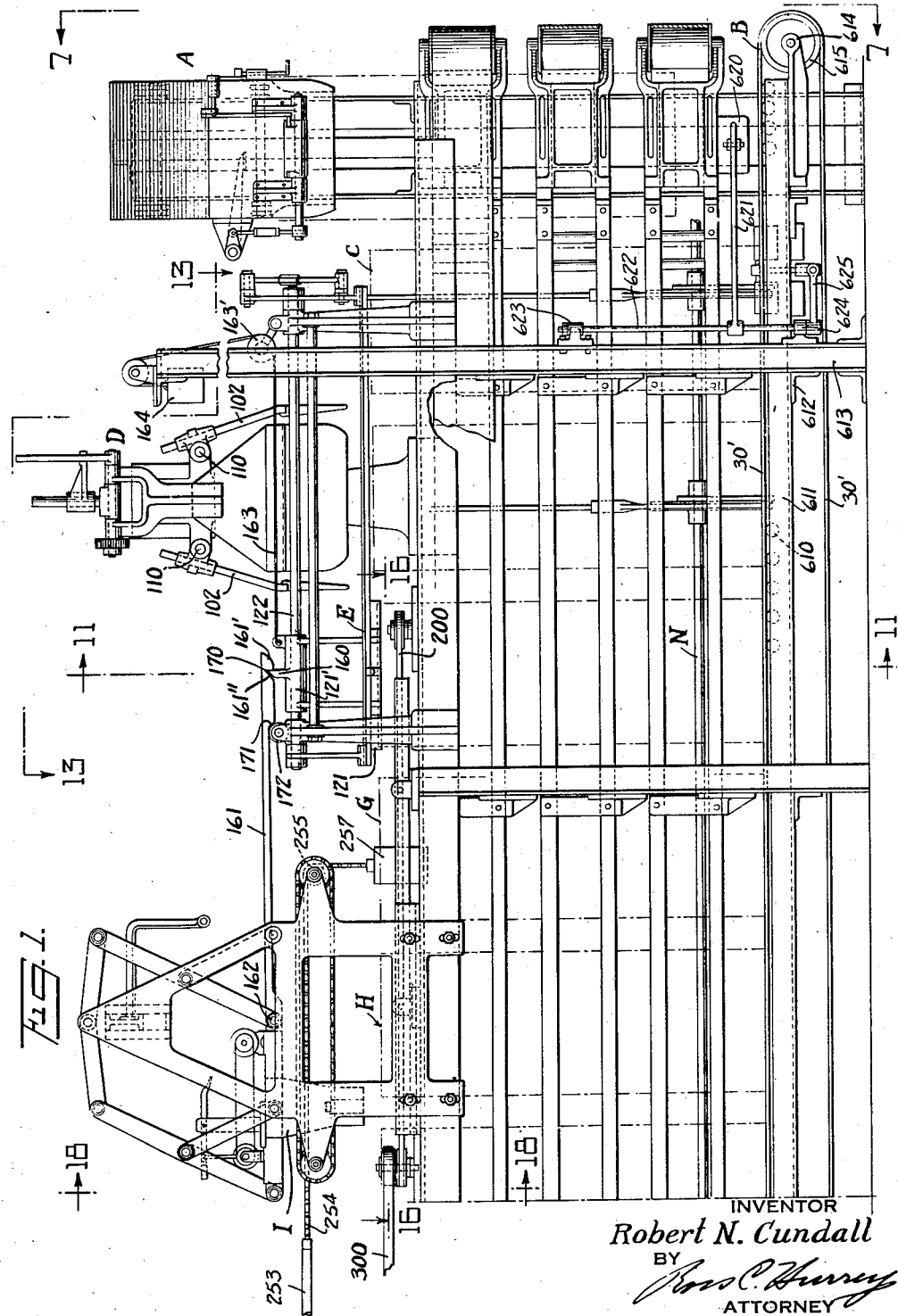
INVENTOR
Robert N. Cundall
BY
ATTORNEY

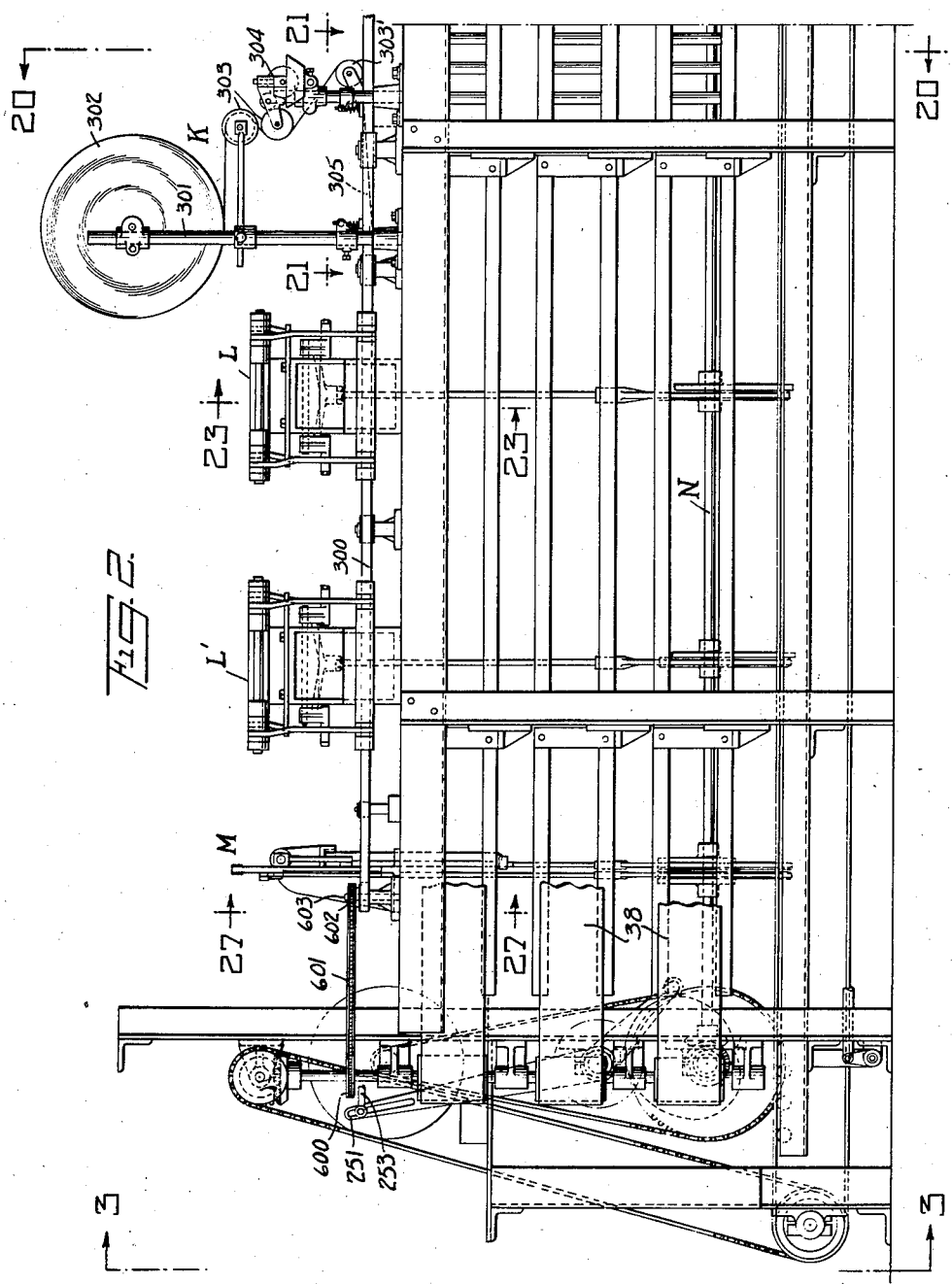

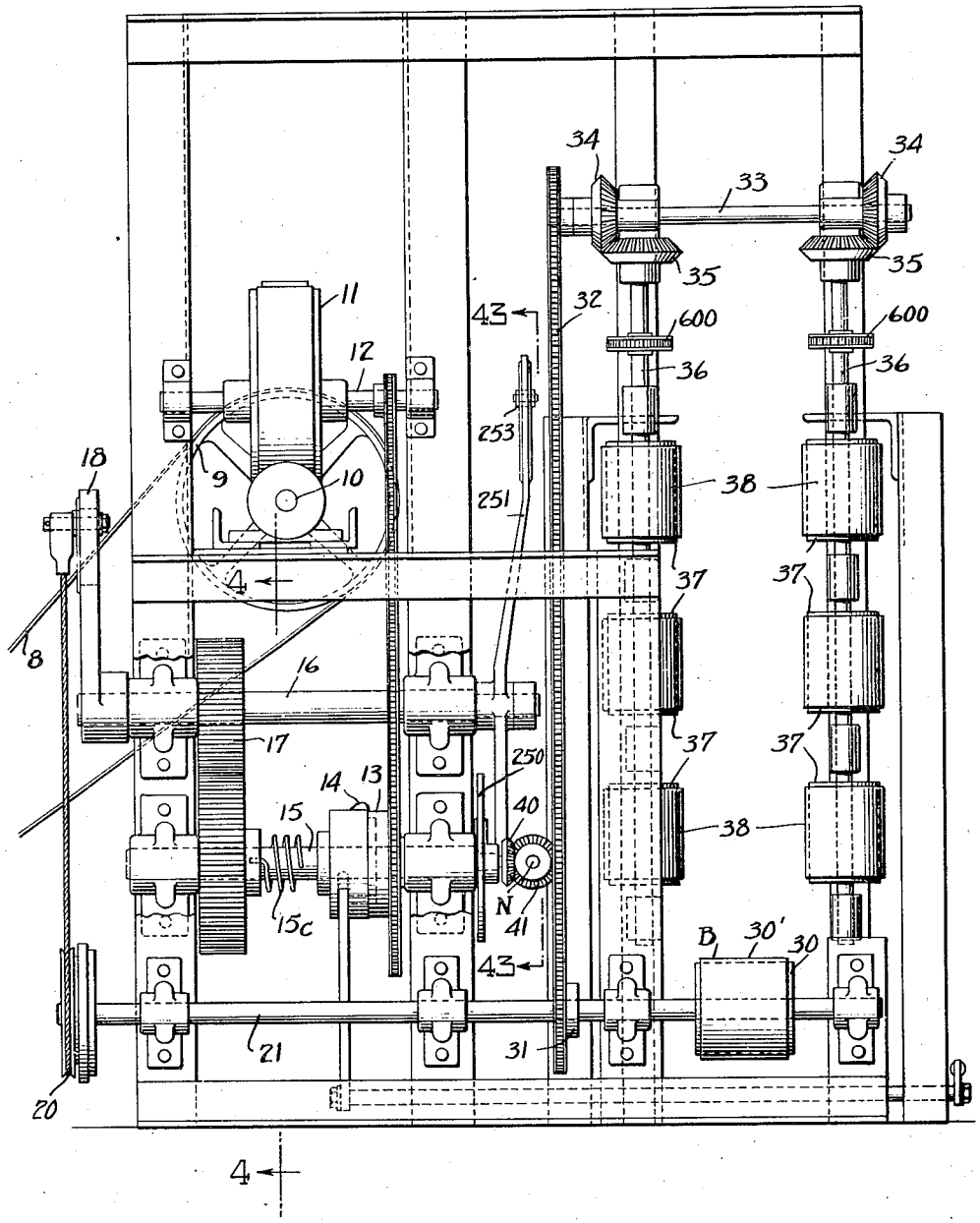

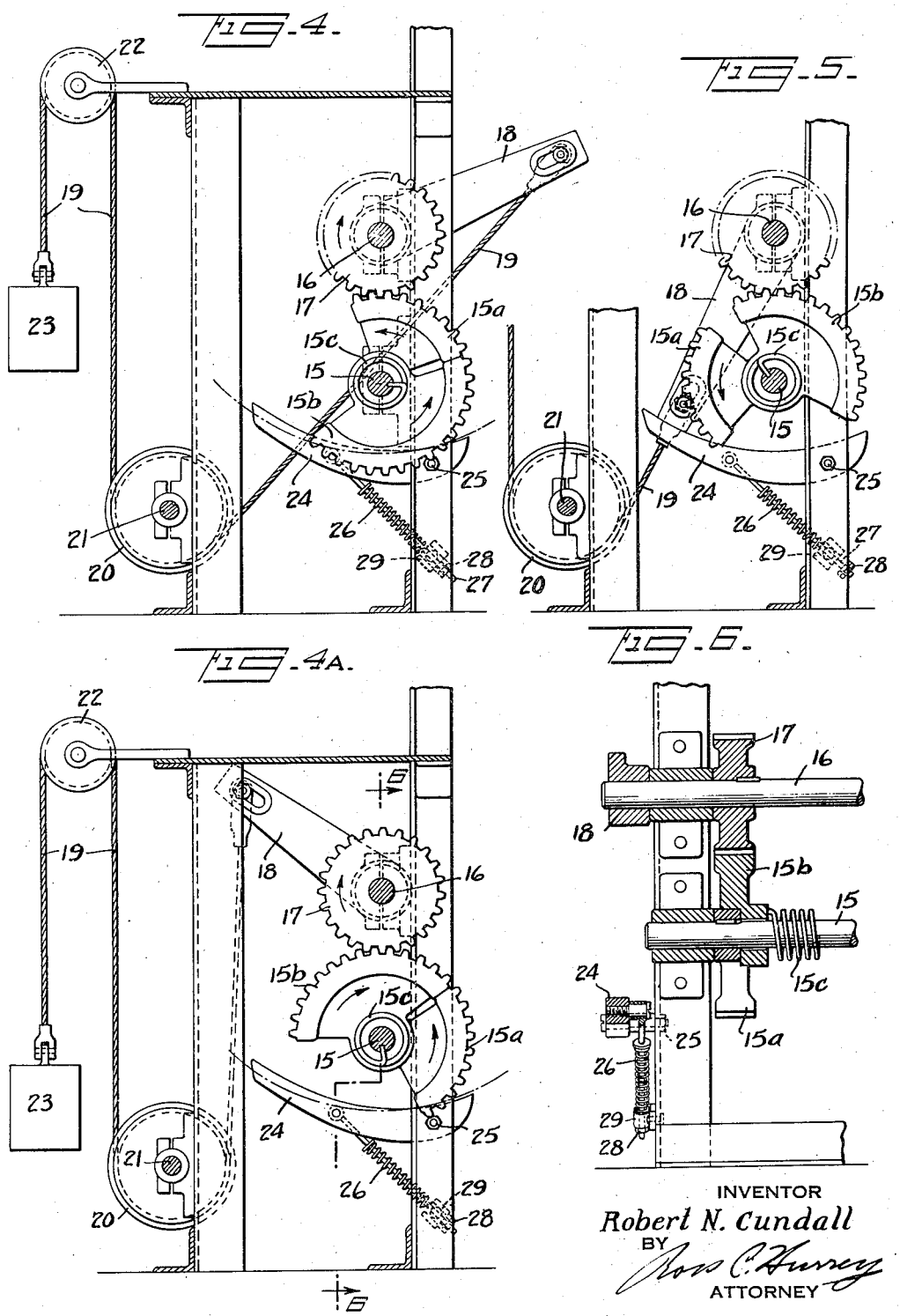

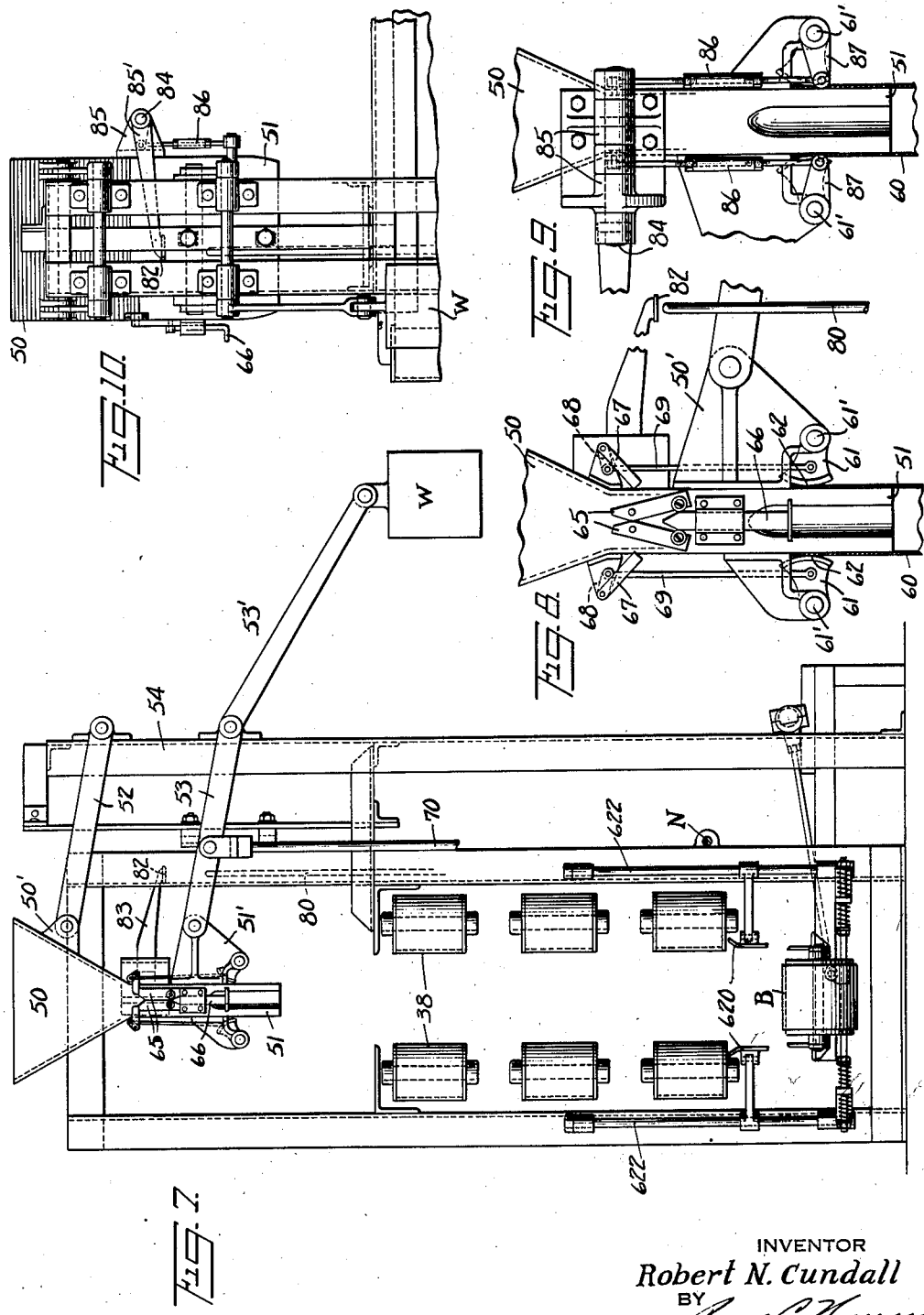

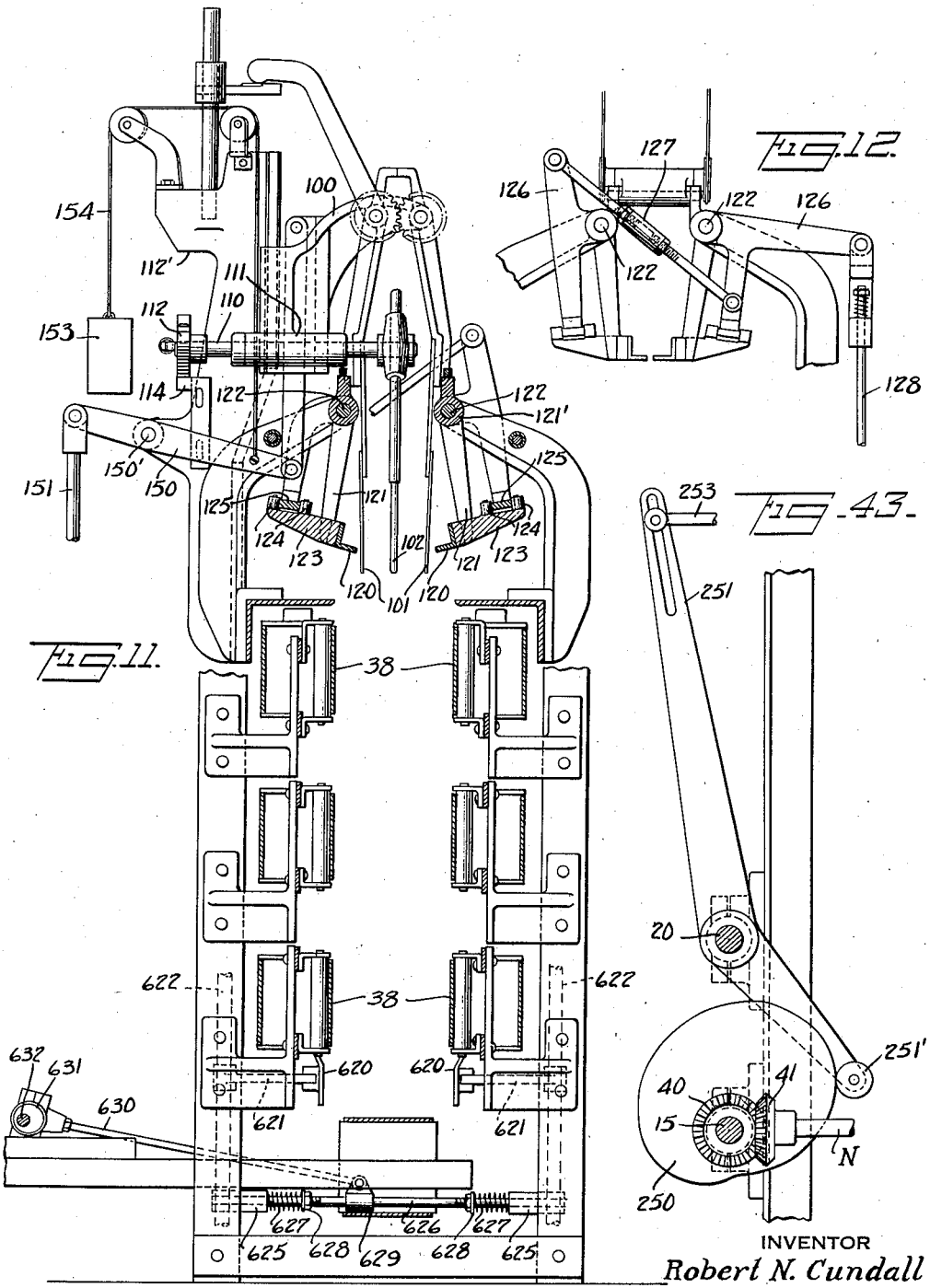

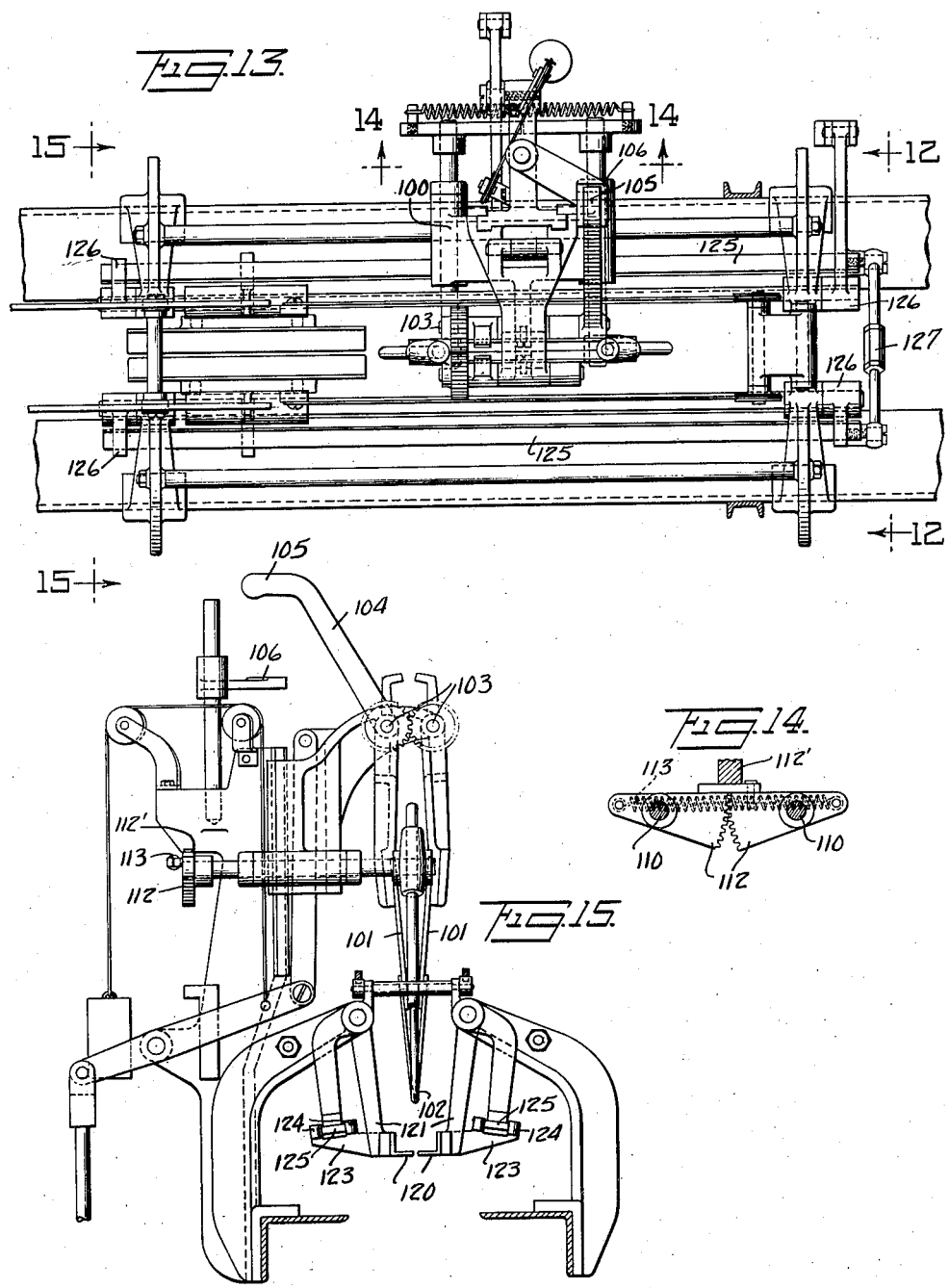

May 30, 1939. R. N. CUNDALL 2,160,059
APPARATUS FOR CLOSING, SEWING, AND SEALING BAGS
Filed Nov. 2, 1932 14 Sheets-Sheet 8
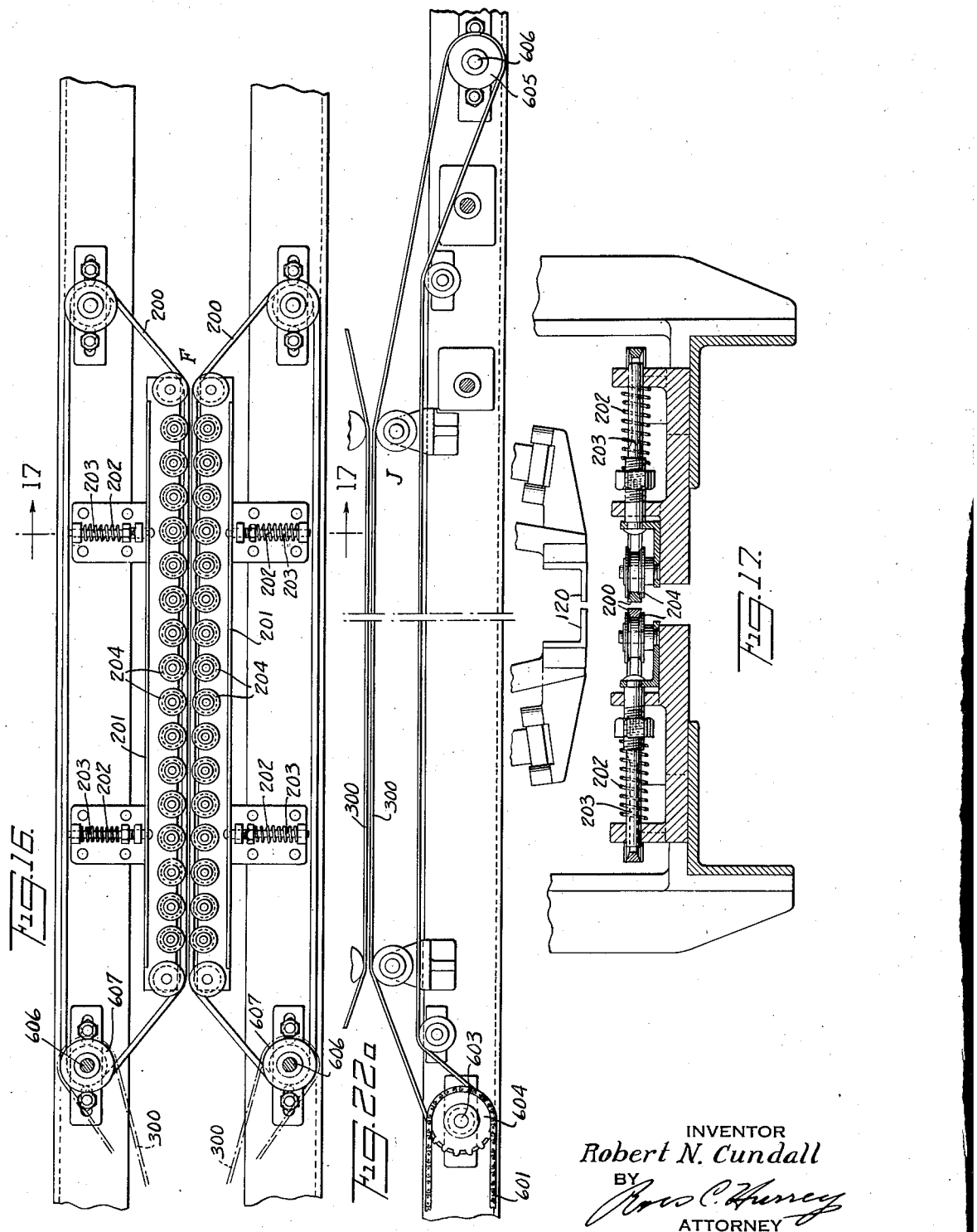
INVENTOR
*Robert N. Cundall*
BY
ATTORNEY

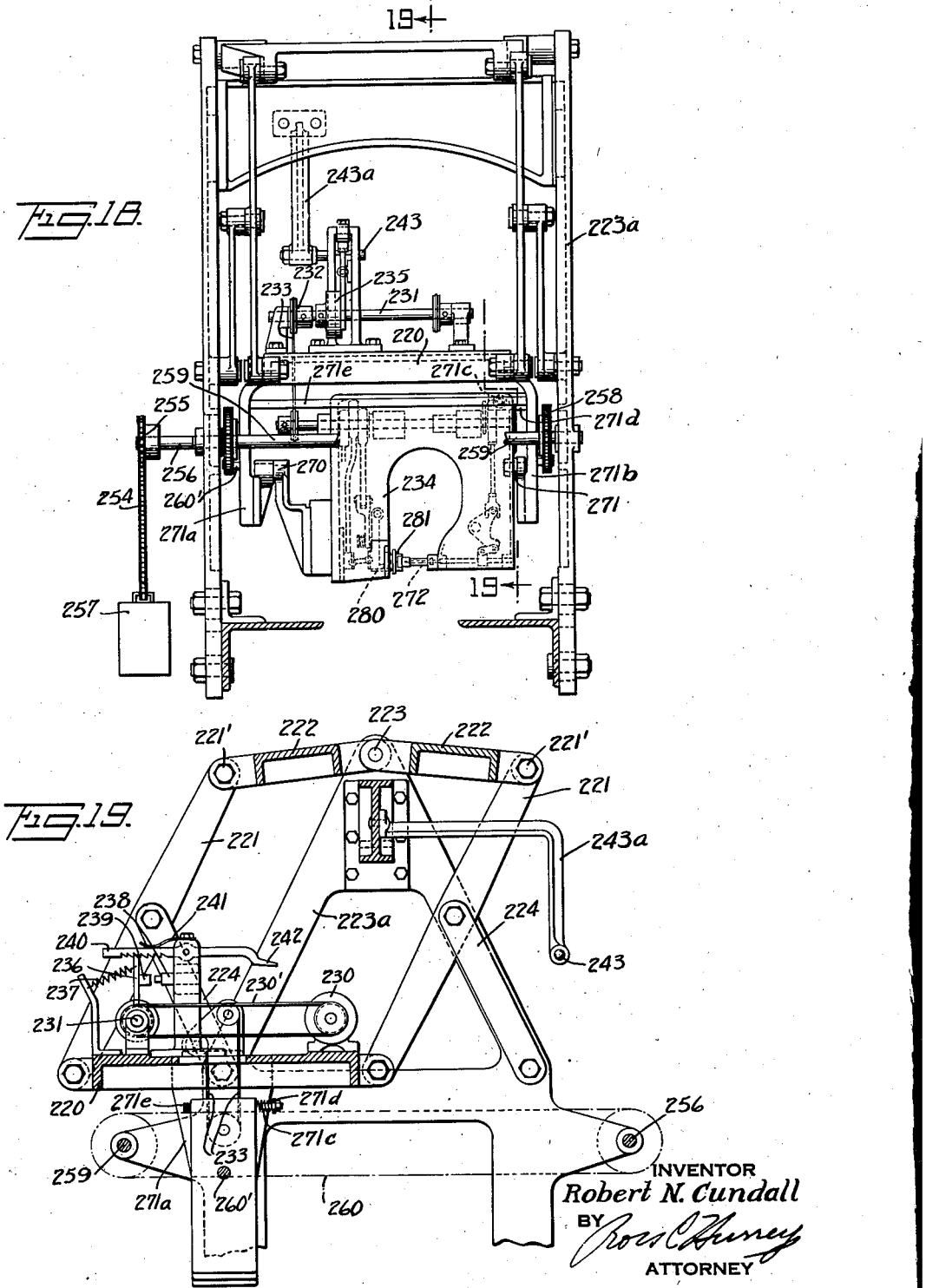

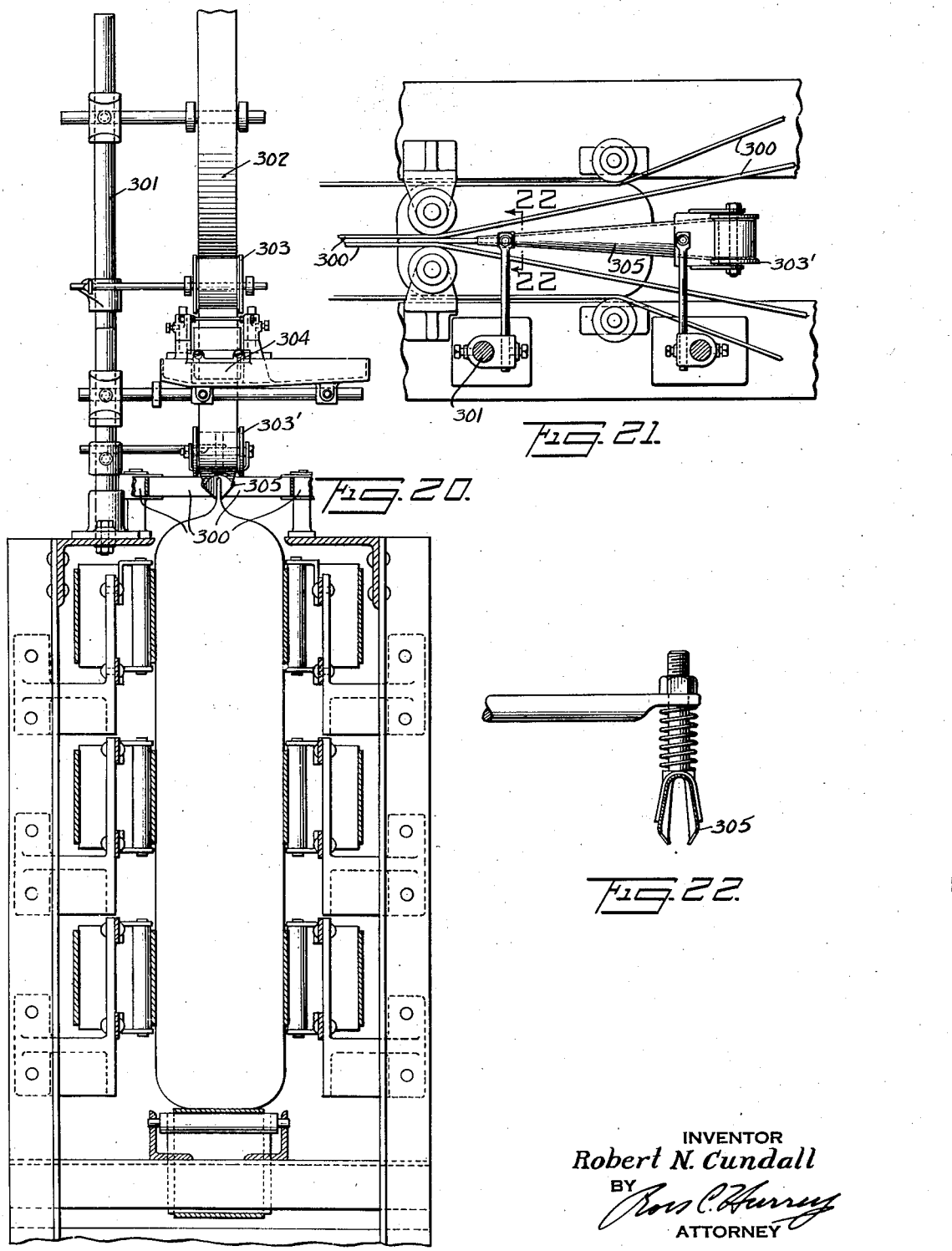

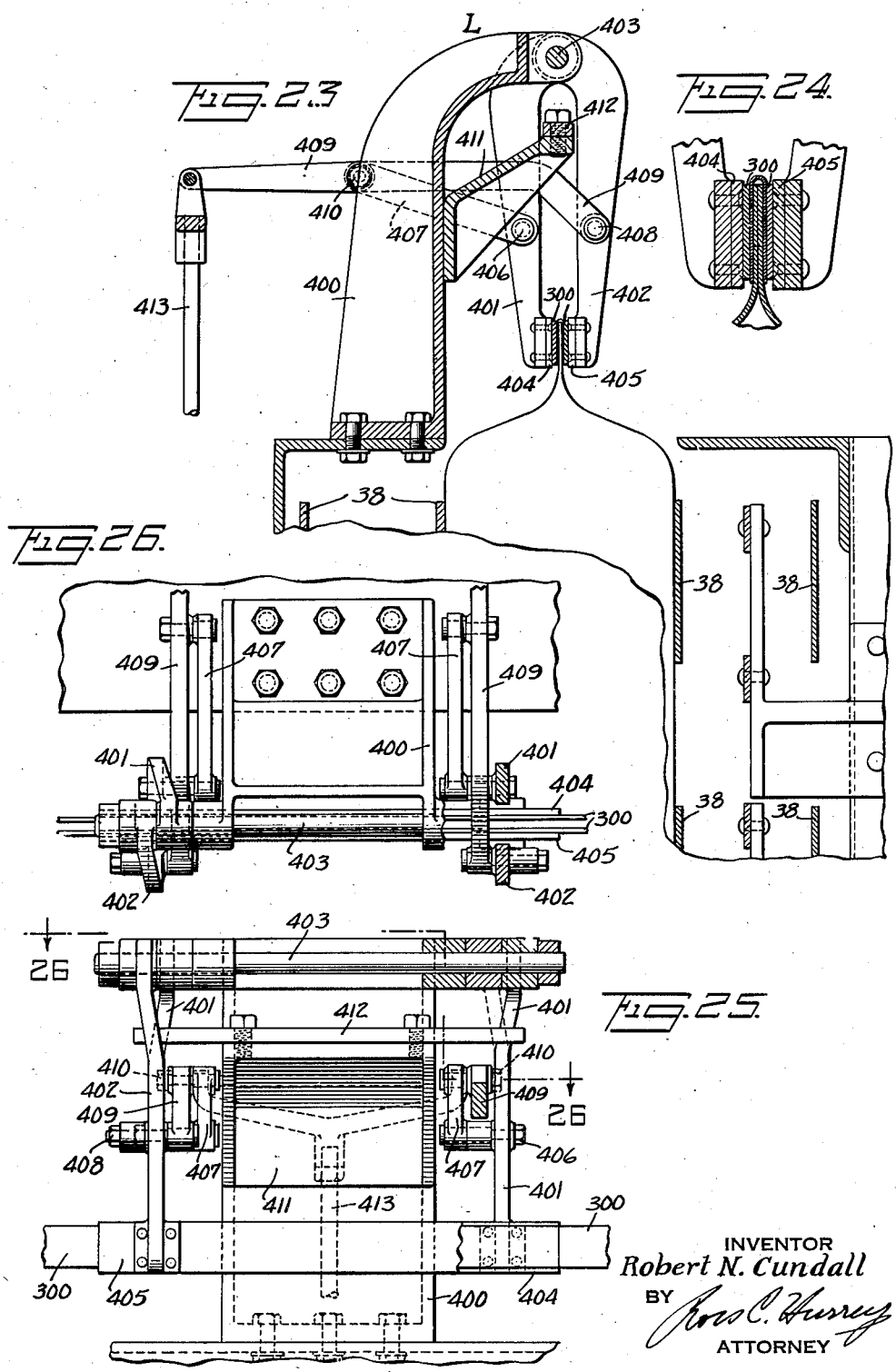

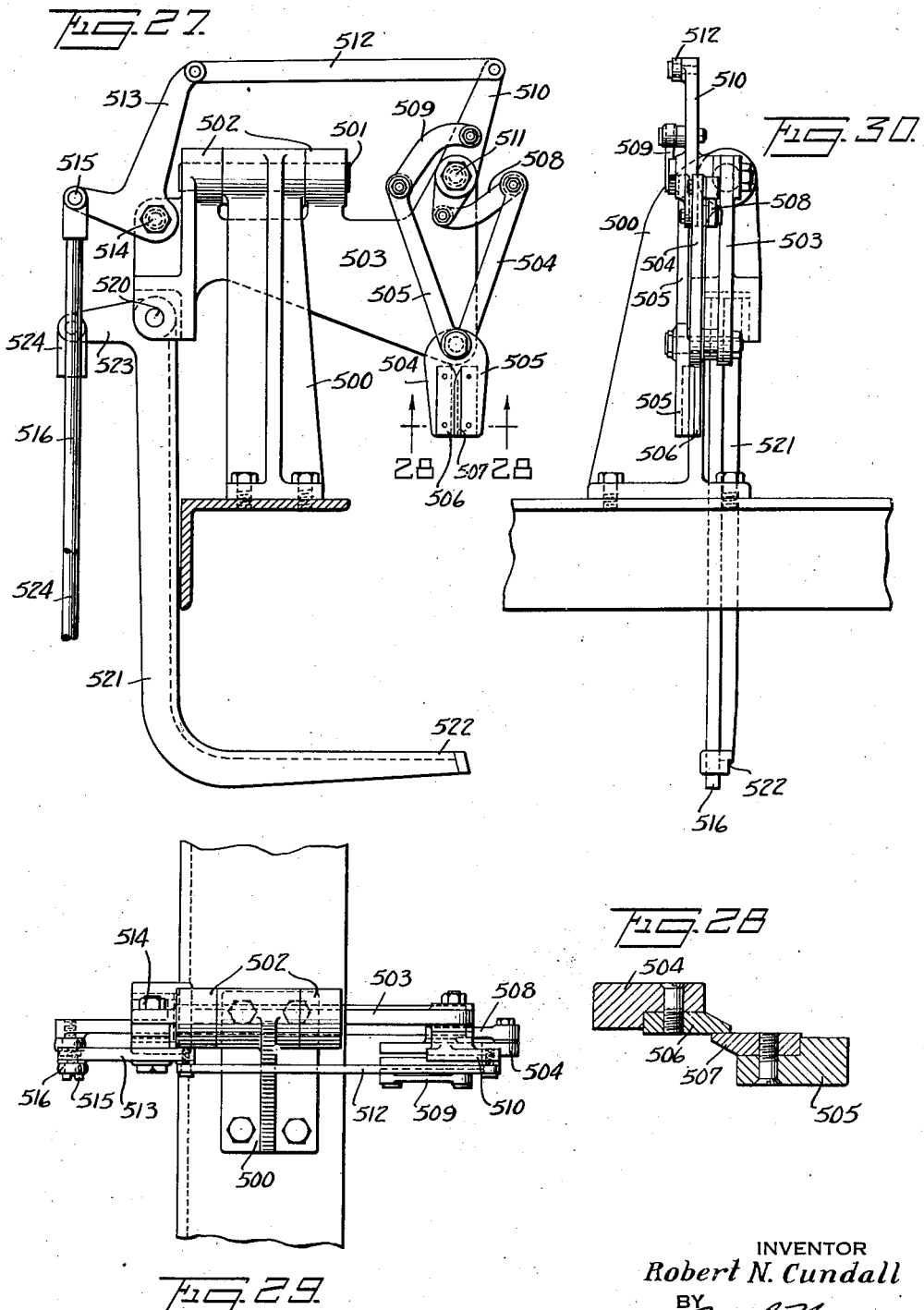

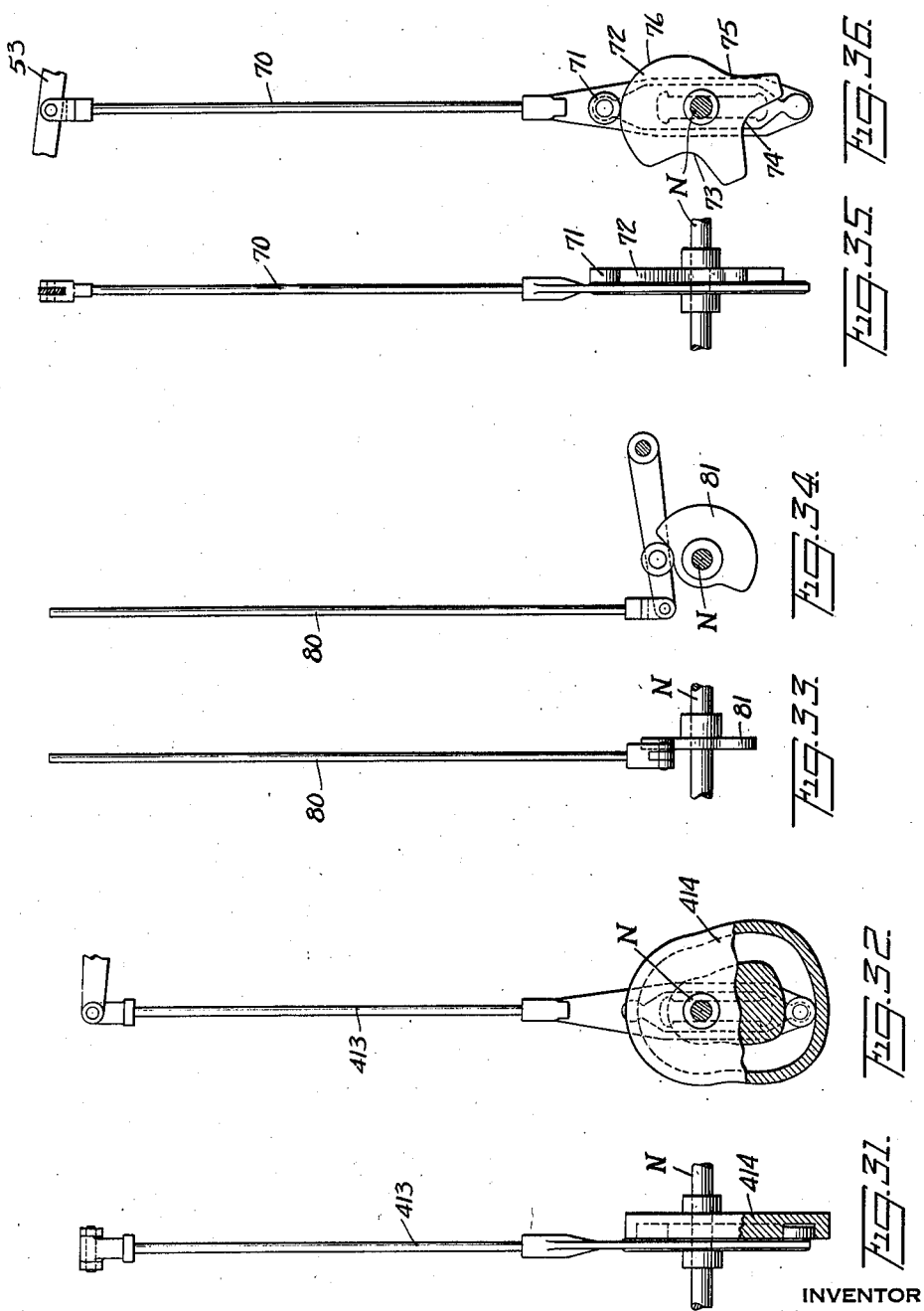

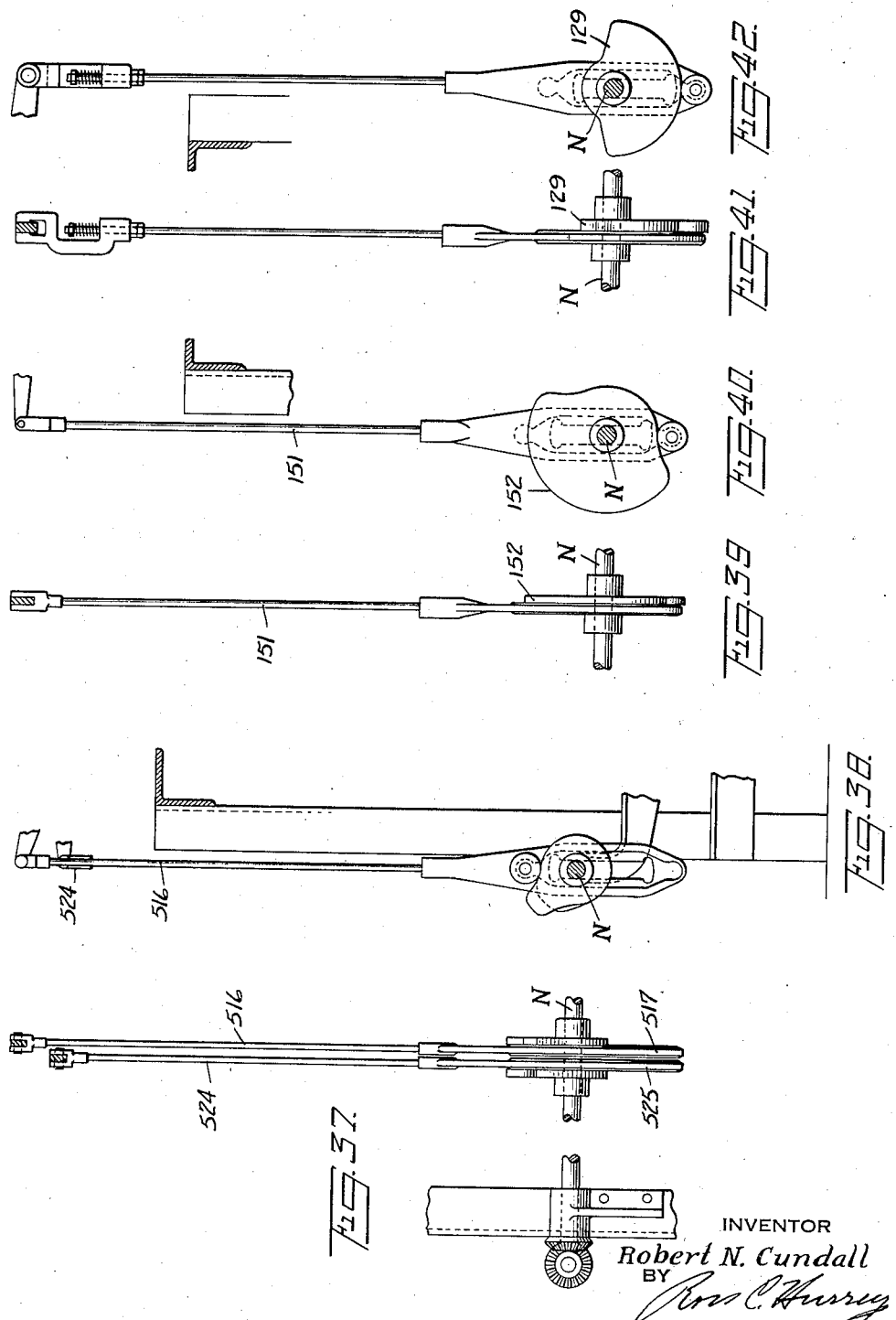

Patented May 30, 1939

2,160,059

UNITED STATES PATENT OFFICE 2,160,059

APPARATUS FOR CLOSING, SEWING, AND SEALING BAGS

Robert N. Cundall, Lackawanna, N. Y., assignor to Bagpak, Inc., a corporation of Delaware Application November 2, 1932, Serial No. 640,758

31 Claims. (Cl. 112—11)

My invention relates to apparatus for filling, closing, sewing and sealing open-mouth bags, such for example as paper bags of relatively large size, adapted to contain as much as 100 pounds or more of cement or other pulverulent or granular material.

Prior to my invention, there has been no satisfactory machine for accomplishing the purpose recited above, and it has been necessary to resort to manual filling, closing, sewing and sealing operations. It will be realized, however, that with bags of the size indicated hereinabove, such operations are performed manually only with excessive and tedious labor.

It is therefore an object of my invention to provide apparatus for mechanically accomplishing the purpose set forth. My invention has for further objects numerous improvements in operative advantages and construction, both with respect to the apparatus as a whole and the several portions thereof, as will hereinafter be found to obtain.

In order that my invention may clearly be set forth and understood, I now describe, with reference to the drawings accompanying and forming a part of this specification, a preferred form and manner in which it may be embodied. In these drawings, Fig. 1 is a side-elevational view of the entering end of a machine constructed in accordance with my invention, including mouth closing and sewing stations;

Fig. 2 is a side-elevational view of the remainder of the machine, showing tape-applying, squeezing and severing stations;

Fig. 3 is an end-elevational view of the apparatus shown in Figs. 1 and 2, taken along the line 3—3 of Fig. 2, illustrating a portion of the driving mechanism for the apparatus;

Fig. 4 is a vertical sectional view, taken along the line 4—4 of Fig. 3;

Figs. 4a and 5 are similar views of a portion of the mechanism shown in Fig. 4, shown in a different position;

Fig. 6 is a sectional view, taken on the line 6—6 of Fig. 4a;

Fig. 7 is an end-elevational view of the machine, taken in the direction of the arrows 7—7 of Fig. 1;

Figs. 8, 9 and 10 are detailed elevational views of a filling spout and mechanism associated therewith at the entering end of the machine;

Fig. 11 is a vertical sectional view of mechanism for closing and gusseting the mouth of a bag, taken on the line 11—11 of Fig. 1;

Fig. 12 is a similar view, but taken from the opposite side, of a portion of the apparatus shown in Fig. 11;

Fig. 13 is a plan view of bag-closing mechanism, taken in the direction of arrows 13—13 on Fig. 1;

Fig. 14 is a vertical sectional view of a portion of the apparatus shown in Fig. 13, taken on the line 14—14 of Fig. 13;

Fig. 15 is a view generally similar to Fig. 11, but showing the parts in a different position, and being taken on the line 15—15 of Fig. 13;

Fig. 16 is a horizontal sectional view, taken on the direction of arrows 16—16 of Fig. 1, and illustrating apparatus for gripping the bags during the sewing operation;

Fig. 17 is a vertical sectional view, taken on the line 17—17 of Fig. 16;

Fig. 18 is an end elevational view of a movable sewing head and carriage therefor, taken on the line 18—18 of Fig. 1;

Fig. 19 is a vertical sectional view of the same, taken on the line 19—19 of Fig. 18;

Fig. 20 is an end-elevational view of tape-applying mechanism forming a part of the apparatus illustrated in Fig. 2;

Fig. 21 is a horizontal sectional view of a portion of the same, taken on the line 21—21 of Fig. 2;

Fig. 22 is an elevational view, on an enlarged scale, of a portion of the apparatus illustrated in Figs. 20 and 21;

Fig. 22a is a plan view, showing the general arrangement of gripping and guiding belts used in connection with the tape-applying mechanism shown in Figs. 2, 20, 21 and 22;

Fig. 23 is a vertical sectional view of tape-squeezing mechanism forming a part of the apparatus shown in Fig. 2, taken on the line 23—23 of Fig. 2;

Fig. 24 is a similar view on an enlarged scale, of a portion of the apparatus shown in Fig. 23;

Fig. 25 is a side-elevational view of the squeezing mechanism illustrated in Fig. 23;

Fig. 26 is a plan view of the apparatus shown in Fig. 25, parts having been broken away;

Fig. 27 is an elevational view of tape-severing mechanism forming a part of the apparatus shown in Fig. 2;

Fig. 28 is a horizontal sectional view of a portion of the apparatus shown in Fig. 27, taken on the line 28—28 of Fig. 27;

Fig. 29 is a plan view of apparatus shown in Fig. 27;

Fig. 30 is a front-elevational view of the same;

Figs. 31 to 42, inclusive, are elevational views of various cam mechanisms forming a part of the apparatus shown in Figs. 1 and 2; and Fig. 43 is a vertical sectional view, taken along the line 43—43 of Fig. 3.

Similar reference characters and numerals designate the same or similar parts in the several views of the drawings.

The machine as a whole

This machine consists of a number of units adapted to operate in sequence upon a bag. Referring to Figs. 1 and 2, the general organization is as follows:

The bag is filled while attached to a spout at a station A. After being filled it moves upon a conveyor B to an idle station desgnated as C. The conveyor B moves intermittently and advances a step after each bag is filled. The filled bag moves from the idle station C to a closing station D where its mouth is closed and gusseted. The mouth is held in this condition while the bag advances to an idle station E.

At the station E the bag comes into the grip of belts F, shown in Fig. 16. At the next step of the machine, the bag moves upon the conveyor B to an idle station G, still in the grip of the belts F. The next movement of the bag brings it to a sewing station H. While the bag is at rest at the station H, its lips, which project above the belts F, are sewed by a sewing head I which is mounted upon a reciprocated carriage and traverses the bag. When the sewing head has reached the end of its travel, which is to the right of its position as shown in Fig. 1, the bag moves forward again on the conveyor B and is accompanied by the sewing head.

In thus moving forward, the bag leaves the grip of the belts F and approaches the grip of a second pair of belts J, shown in Fig. 22a. The next forward step of the bag brings its mouth beneath a mechanism K, shown in Fig. 2, which applies a pasted tape over the mouth of the bag and over the stitches just previously sewed therein. The next forward step of the bag brings its mouth, now covered by the pasted tape, between the jaws of a squeezing device L which, while the bag is stationary, acts to press and squeeze the pasted tape on to the mouth of the bag.

Further forward movement of the bag brings it into the grip of a second squeezing device L' identical with the first squeezer L. It will be understood that as many such squeezing devices can be included as may be found necessary to produce a firm grip of the tape.

At each period of rest of the conveyor B, a bag is filled and takes its place in the procession of bags, so that a continuous series of bags passes through the machine. These bags are joined together by the stitching applied at the station I and also by the pasted tape applied at the station K. To sever the combined tape and stitching a station M is provided. At station M the tape and stitching connecting the bags is severed and the end bag at its next forward step is delivered out of the machine.

The mechanisms at the various stations operate in timed relation to the movements of the conveyor B. These mechanisms are driven from a cam shaft N, shown in Figs. 1, 2 and 3, which extends along the machine at its right hand side as viewed from the entering end.

Driving mechanism

The driving mechanism is best shown in Figs. 3, 4, 5 and 6. A motor (not shown) operates through a belt 8 and a pulley 9 to drive a shaft 10 which operates through a reducing gear 11 to drive a shaft 12 journaled at right angles to shaft 10. The shaft 12 runs continuously and drives one member 13 of a clutch 14 mounted upon a shaft 15. The member 13 is free to rotate about the shaft 15 until the clutch 14 is engaged, when the shaft 15 rotates in unison with the member 13.

Mounted on the shaft 15 is a segmental gear 15a keyed to the shaft 15 and a segmental gear 15b which is free to rotate about the shaft 15 but is restrained by the action of a coil spring 15c, one end of which is rigidly secured to the shaft 15. The spring 15c tends to maintain the segment 15b in abutting, following relation to the segment 15a, as shown in Fig. 4. The segments 15a and 15b are peripherally in alignment. Mounted above the shaft 15 and parallel thereto is a countershaft 16. A pinion 17 ih keyed to the shaft 16 and meshes with the segments 15a and 15b.

An arm 18 keyed to the shaft 16 has secured at its outer end a cable or sprocket chain 19. This cable runs around a pulley 20 mounted upon a shaft 21 and then passes over an idle pulley 22. A counterweight 23 is suspended from the opposite end of the cable 19 for the purpose of maintaining a tension upon the cable 19 and returning the parts. The pulley 20 has a ratchet connection with the shaft 21 and rotates the latter only in a counter-clockwise direction, as viewed in Figs. 4 and 5. Due to angularity between the cable 19 and the arm 18, a full rotation of the arm 18 draws the cable 19 first in one direction and then in the other with substantially sinusoidal acceleration and deceleration, and thus causes the shaft 21 to rotate intermittently, each advancing motion being sinusoidal in character.

It will be apparent that if the arm 18 were driven uniformly and continuously around the shaft 16, the periods of rotation and rest of the shaft 21 would be equal in duration. However, it is desired to make the periods of rest of the shaft 21 of relatively long duration with respect to the periods of rotation, for the reason that the periods of rest correspond to various time-consuming operations such as the filling and sewing of the bag, and if the periods of rotation, which correspond to the movements of the bags along the conveyor, were of equal duration, the output of the machine would be considerably reduced.

The purpose of the segmental gears 15a and 15b is to provide for relatively short periods of rotation of the shaft 21 and relatively long periods of rest of the same, and the manner in which the mechanism just described operates to achieve this result is as follows:

In Fig. 5, the arm 18 is shown in its lower dead-center position with respect to the pull exerted by the counterweight 23, the counterweight 23 being at the bottom of its travel. The keyed segment 15a is out of mesh with the pinion 17 and is passing downward on the iefthand side of the shaft 15 as viewed in Fig. 5. Due partly to the fact that the strength of the spring 15c is insufficient to advance the shaft 21 and due also to the restraining action of a brake-shoe 24 which will be described in detail hereinbelow, the follower segment 15b, the pinion 17, the arm 18 and the shaft 21 are at this time stationary and remain so until the keyed segment 15a strikes the rear face of the follower segment 15b and causes it to rotate the pinion 17, thus swinging the arm 18 in a clock-wise direction as viewed from the point of view of Fig. 5.

The shaft 21 then rotates with sinusoidal acceleration and deceleration, passing through the position shown in Fig. 4a, until the arm 18 reaches its upper dead-center position directly opposite to that in which it is shown in Fig. 5. At this point, rotation of the shaft 21 ceases. Also at this point, the keyed segment 15a has just come into mesh with the pinion 17. This is necessary, for the reason that if the arm 18 passed its upper dead-center position during such time as the pinion 17 were in mesh only with the follower segment 15b, the combined effect of the counterweight 23 and the spring 15c would cause the follower segment 15b to travel ahead of the keyed segment 15a and the arm 18 would rapidly return to its lower dead-center position in which it is shown in Fig. 5. However, the intermeshing of the keyed segment 15a with the pinion 17 limits the return of the arm 18 under the influence of the counterweight 23.

Very shortly after the keyed segment 15a comes into mesh with pinion 17 the follower segment 15b passes out of mesh with the pinion 17 and under the influence of the spring 15c returns to a position behind the segment 15a, in which position it is shown in Fig. 4. Further rotation of the keyed segment 15a brings the arm 18 back to its lower dead-center position in which it is shown in Fig. 5, the segment 15b following the segment 15a only a short distance after the latter has passed out of mesh with the pinion 17. The apparatus is now returned to the position in which it is shown in Fig. 5, the shaft 21 remaining stationary until the keyed segment 15a again strikes the rear face of the follower segment 15b.

In the specific instance illustrated in the drawings, the pinion 17 is provided with 24 teeth and the segments 15a and 15b are provided with 9 teeth and 15 teeth, respectively, or a total of 24 teeth, cut on a circle of sufficient size to accommodate a possible total of 36 teeth. Due to this relation and due also to the fact that the arm 18 rotates the shaft 21 during only one-half of its complete circle of 360° around the shaft 16, the shaft 21 is caused to have a motion period of relatively 120° and a rest period of relatively 240°; that is to say, the rest periods of the shaft 21 are twice as long as its motion periods.

The purpose of the brake 24 is simply to prevent the arm 18 from passing its lower dead-center position under the influence of the spring 15c. The brake-shoe 24 is pivoted at 25 and is urged upwardly by a compression spring 26 mounted on a rod 27 having a stop 28 and passing through a pivoted slide 29. The upper surface of the brake-shoe 24 in the position shown in Fig. 5 is arcuate with respect to the center of the shaft 16, but as the arm 18 passes on, the left-hand end of the brake-shoe 24 moves slightly upward into the position in which it is shown in Fig. 4 under the influence of the spring 26, the upward travel of the left-hand end of the brake-shoe 24 being limited by the stop 28.

The shaft 21 is parallel to the shafts 15 and 16. On the right-hand end on the shaft 21 is mounted a pulley 30, shown in Fig. 3, which drives the belt 30' of the conveyor B. A sprocket 31 is mounted on the shaft 25 and through a sprocket chain 32 drives a shaft 33. The shaft 33 carries bevel pinions 34 meshing with bevel gears 35, each bevel gear being mounted upon a vertical shaft 36. Each of the shafts 36 carries a series of pulleys 37 which act to drive lateral supporting belts 38, which belts support the bag against lateral tipping and assist in accelerating and decelerating all portions of the bag equally along its vertical axis.

It will be noted from Fig. 3 that the shaft 15 has at its right-hand end a bevel pinion 40 meshing with an equal sized bevel pinion 41 which is keyed to the cam shaft N. As a result, each revolution of the shaft 15 produces a period of rest and a period of movement of the conveyor B and simultaneously one complete revolution of the cam shaft N. One revolution of the cam shaft N will produce a complete cycle at each of the operating stations.

*Bag filling mechanism*

The spout and its associated parts are best shown in Figs. 1, 7, 8, 9, 10, 35 and 36. This mechanism consists of a hopper 50 terminating in a spout 51. The hopper and spout are integrally joined and have mounted thereon lugs 50' and 51'. Pivoted to the lugs are levers 52 and 53 pivotally secured at their opposite ends to the fixed frame 54. This mounting permits the spout to move vertically, and the weight of the hopper and spout is counterbalanced by a weight W secured at one end of an extension 53' of the arm 53.

A bag 60 is brought up over the spout, as shown in Figs. 8 and 9, with its sides between the spout wall and a pair of clamping members 61. These clamping members are pivotally mounted on shafts 61' and have clamping surfaces 62 eccentric to the shafts 61'. When the clamps 61 are lowered, the clamping surfaces 62 press the bag 60 and hold it against the spout wall. In this condition the weight of the bag and its contents serves to intensify the clamping effect due to the eccentricity of the clamp surface 62. The clamps 61 are initially held in raised position to provide clearance beween their gripping surfaces and the spout wall by a pair of latch members 65, and are thus shown in Fig. 7.

As soon as the operator has brought the bag into the requisite position he presses upwardly a member 66 which serves to force apart the lower ends of the latch members 65, thus withdrawing the upper ends of these members from under a pair of cooperating levers 67. The levers 67 support the clamps 61 through cranks 68 and rods 69. Accordingly, when the member 66 is pressed upwardly, with the effect indicated above, the clamps 61 drop and engage the bag.

At this time pulverulent material may be dumped from any suitable device into the hopper 50. The material enters into the bag which is at this time suspended from the spout and the weight of the material tends to overcome the effect of the counterweight W and thus tends to draw the spout downwardly. During this time the conveyor B is stationary but the shaft N is rotating. Pivotally attached to the arm 53 is a rod 70. At the lower end of this rod (Figs. 35 and 36) is a cam follower 71 which, after the bag receives a small amount of material, is caused to bear upon a cam 72 keyed to the shaft N. The cam 72 is provided with cut-away portions or recesses 73, 74 and 75 and with a constant radius portion 76.

With the weight of the hopper plus the weight of the material in the suspended bag overcoming the effect of the counterweight W, rotation of the cam 72 permits the follower 71, the rod 70, the arm 53, the hopper 50 and the bag 60 to drop at each of the cut-away portions 73, 74 and 75, thus jogging the bag and causing its contents to settle during the filling operation.

At the time the follower 71 enters the last cut-away portion 75 the spout is in its lowermost position, the bag is full and is resting upon the conveyor B. At this moment a rod 80 (Figs. 7, 33 and 34) actuated by a cam 81 on shaft N is thrust upwardly and strikes the end-face 82 of an arm 83 mounted upon a shaft 84.

The follower 71 bears upon the surface of the cam 72 only when there is sufficient material within the hopper 50 or the bag suspended therefrom to raise the counterweight W, the weight of the empty bag alone being insufficient to raise the counterweight W and lower the hopper 50 and spout 51.

The configuration of the cam 81 is such that the rod 80 is lowered prior to the time when the weight of material in the bag or the hopper 50 causes the latter to descend against the action of the counterweight W, and the raising of the rod 80 normally occurs at the time when the cam follower 71 traverses the cut-away portion 75 of the cam 72; in other words, after the bag has been filled and settled and the hopper 50 and spout 51 are in their lowermost positions, the counterweight W being raised.

Raising the clamping surfaces 62 and releasing the bag from the spout 51 then permits the latter to rise clear of the bag under the action of the counterweight W, the cam follower 71 rising clear of the cam 72, where it remains until the next bag is being filled.

The shaft 84 is journaled in a pair of lugs 85 at the rearward end of the spout of hopper 50. Keyed to the shaft 84 are a pair of crank arms 85' which act through adjustable draw rods 86 and crank arms 87 to turn the shafts 61' and release the clamps 61, thus permitting the spout to rise clear of the bag under the action of the counterweight W. The conveyor B then begins its forward movement to carry the filled bag out from under the spout.

*Closing and gusseting mechanism*

It is desirable that the mouth of the bag be closed and gusseted and that this be done uniformly through an indeterminate series of bags. The gusseting produces a bag of uniform width throughout its length, shortens the length of the closing seam, and strengthens the entire closure at the bag mouth. The mechanism shown at station D of Fig. 1 accomplishes this purpose. This mechanism is illustrated in further detail in Figs. 11 to 15, 31, 32, 41 and 42.

The movement of the conveyor B brings the filled bag directly under a vertically reciprocable head 100. This head includes a pair of plates 101 and a pair of fingers 102 moving at right angles to the direction of motion of the plates. With the parts in the position shown in Fig. 15, the head moves downwardly carrying the plates 101 into the mouth of the bag but with the fingers 102 lying outside the bag mouth as shown in Fig. 1. The plates 101 are mounted to swing about shafts 103 and are geared together so that a swinging movement of one produces an equal swinging movement of the other.

Extending upwardly and to the left of the left-hand shaft 103 as shown in Fig. 15 is an arm 104 terminating in a substantially horizontal portion 105. The downward movement of the head brings the portion 105 of the arm 104 into contact with a lug 106 which is yieldably biased against vertical downward movement. The effect of contact between the lug 106 and the member 105 is to produce a yielding, diverging movement of the plates 101. This movement spreads the bag mouth into rectangular form.

The fingers 102 are mounted upon shafts 110 journaled in lugs 111 on the head 100. At the opposite ends of the shafts 110 are a pair of intermeshing gear segments 112 (Fig. 14). The segments 112 are extended on the sides of shaft 110 opposite to the toothed surfaces and these extended ends are joined by a tension spring 113. Downward movement of the head 100 carries the segments 112 into contact with a fixed adjustable lug 114, shown in Fig. 11. Further movement of the head 100 after contact is established between the segments 112 and the lug 114 causes the segments to swing, rotating the shafts 110 and forcing the fingers 102 inwardly. The downward movement of the fingers 102 presses the ends of the spread bag mouth inwardly and draws the plates 101 toward each other against the yielding resistance of the lug 106, thus forming a gusseted closure of the bag mouth.

It will be seen from Fig. 14 that when the outer ends of the segments 112 are rocked below the horizontal center lines of the shaft 110 a toggle action takes place and the segments arrive at a state of stable equilibrium under the action of spring 113. This condition retains the fingers 102 in their inward position. At this time the head 100 begins an upward movement which permits the plates 101 to remain in mutual juxtaposition and the fingers 102 remain in inward position for the reasons just above noted.

Means are provided to hold the mouth of the bag in its closed, gusseted position after withdrawal of the plates 101 and fingers 102 by the upward movement of the head 100. Such means comprises clamping members 120, shown in Figs. 11, 12 and 15. The members 120 are mounted upon arms 121 which arms are free to rotate about and slide along a pair of shafts 122. Extending from the opposite side of the arms 121 are lugs 123 carrying pairs of rollers 124, each pair engaging on opposite sides of a swinging rail 125. Each rail 125 extends between a pair of bell-cranks 126. Each pair of bell-cranks is keyed to one of the shafts 122. The pair of bell-cranks 126 at the entering end of the machine are connected by a rod 127 placed and proportioned to produce equal rocking movement of either pair of bell-cranks 126 upon actuation of the other.

Considering Figs. 11, 12 and 13 it will be seen that the parts just described provide means for rocking the clamping members 120 toward each other and permitting them to travel along the rods 122 whether in their open or closed position. The opening and closing movement of the clamps is produced by a rod 128 connected to one end of the forward right-hand bell-crank 126 as viewed in Fig. 12. The rod 128 is actuated by a cam 129 on shaft N, as shown in Figs. 41 and 42.

The vertical reciprocation of the head 100 is produced by a lever 150 pivoted at 150' to the machine frame. The lever 150 is moved through a rod 151 which is actuated by a cam 152 on the shaft N as shown in Figs. 39 and 40. The weight of the head is counterbalanced by a counterweight 153 which acts through a cable 154 to draw the head upwardly. As the head 100 approaches its upward limit of movement the gear members 112 contact a fixed surface 112' on the machine frame and continued upward movement of the head rocks the segments in a direction to move the arms 102 outwardly. As soon as the member 105 passes out of contact with the yieldable lug 106 the plates 101 return to their converging relation. This return movement is facilitated by any suitable tension device (not shown).

Referring to Fig. 1 it will be noted that the clamping members 121, which are mounted by means of sleeves 121' on the rods 122, have an upwardly projecting lug 160 which engages a rod 161 which is pivoted at its opposite end 162 to the reciprocating carriage on which is mounted the sewing head to be described more fully hereinbelow. Cables 163 are also attached to the sleeves 121', passing over the pulleys 163' to a counterweight 164. The action of these parts is as follows:

The counterweight 164 draws the members 121 to their right hand limit of motion opposite to that in which they are shown in Fig. 1. While in that position, the closing head 100 moves downwardly, spreading and gusseting the mouth of the bag. As the gusseting operation is completed the clamping members 121 move inwardly and hold the mouth closed. During this time the carriage on which the sewing head is mounted has moved forwardly until a cam surface 161' at the forward end of the rod 161 engages the inclined surface 161'' on the lug 160 and rides up over the inclined surface permitting the lug 160 to drop into a notch 170 on the rod 161. As the head 100 moves upwardly and clears the mouth of the bag the forward motion of conveyor B is resumed and is accompanied by a movement in the same direction and at the same speed on the part of the sewing head carriage. Due to the engagement of the lug 160 in the notch 170, the sewing head carriage through the rod 161 draws the clamping members 121 in the direction of the motion of the conveyor. As the sewing head reaches its leftward limit of motion an inclined surface 171 on the rod 161 engages a roller 172 mounted on the machine frame and this engagement lifts the right-hand end of the rod 161, disengaging the lug 160 from the notch 170. The clamping members at this time are spread apart by the cam 129 and are returned to their right-hand position by the counterweight 164.

*Sewing head and gripping belt*

The conveyor belts B are brought into motion as previously described by a sinusoidal acceleration. In order to secure uniform and accurate spacing of stitches it is necessary that the sewing head traverse the bag at a uniform speed. It is therefore impossible to pass the bag through the head by means of the conveyor motion. The expedient adopted herein is to traverse the carriage supporting the sewing head across the mouth of the bag at a uniform rate while the bag is at rest. The bag mouth must be held rigidly and gripping belts are provided for this purpose. The parts are shown in Figs. 1, 16, 17, 18 and 19.

Referring to Figs. 16 and 17, a pair of belts 200 are pressed into contact by means of a pair of spring impelled frames 201, the spring pressure being obtained by means of coiled springs 202 and bolts 203 which bolts bear against the frame members 201. These members carry a series of pulleys 204 which are placed close together and opposite each other in pairs. The clamping members 121 which were described above carry the closed mouth of the bag from the closing head into the grip of the belts 200. The belts are driven through mechanism to be described later from the same source as the conveyor B and move in absolute synchronism with it.

Mounted above these belts is a carriage 220 (Figs. 18 and 19). Links 221 are pivoted to each end of the carriage at either side thereof, and these links 221 are pivoted at their upper ends 221' to a pair of link frames 222 which are pivotally mounted at 223 to a supporting frame 223a. Two pairs of links 224 are pivoted at their lower ends to the fixed frame of the machine and at their upper ends to the central portions of the links 221. As a result, the carriage 220 may be given a horizontal reciprocation in a single plane without encountering a sliding friction.

Mounted on the carriage 220 is an electric motor 230 which through a belt 230' drives a shaft 231. Sleeved on one end of the shaft 231 is a pulley 232 which through a belt 233 drives a sewing machine 234. The pulley 232 has a clutch connection 235 with the shaft 231 so that the electric motor may run constantly and the sewing machine be connected and disconnected therefrom by means of the clutch 235. The clutch has an actuating lever 236 to which a spring 237 is connected. The spring tends to hold the clutch-actuating lever in a position to disengage the pulley 232 from the shaft 231. A solenoid 238 is provided and an armature 239 cooperating with the solenoid is secured to the lever 236.

On the same frame which supports the solenoid is a ratchet bar 240 which is pressed into engagement with the free end of the lever 236 by means of a leaf spring 241. When the solenoid 238 is energized it attracts its armature 239 which draws the lever 236 against the action of spring 237 and brings the clutch into engagement driving the sewing machine from the motor. The energization of the solenoid is only momentary. The lever 236 engages the ratchet bar 240 and is held in engaged condition after the solenoid is de-energized. The solenoid is energized at the correct moment by means of a switch operated from the cam shaft N and by various connections forming no part of the present invention and not here shown.

The energization occurs with the carriage in the position in which it is shown in Fig. 19, the bag being just clear to the right of the sewing head 234. The sewing action begins as the conveyor B comes to a stop and the beginning of the sewing action is accompanied by a movement of the carriage 220 to the right from the point of view of Fig. 19. As the carriage moves to the right, traversing the bag, a cam end 242 on the ratchet bar 240 is brought into contact with a bar 243 mounted on an arm 243a fixed to the frame 223a. This engagement rocks the ratchet bar and releases the lever 236 which is then drawn by spring 237 into non-engaging position. The sewing machine ceases operation just as soon as it travels a short distance past the rear end of the bag being sewed.

Referring to Fig. 3, it will be noted that there is a cam 250 keyed to the shaft 15. A lever 251 has a follower 251' (shown in Fig. 43) bearing on this cam. The lever is for convenience pivotally mounted on an extension of the shaft 20. The upper end of the lever 251 is pivotally attached to a draw rod 253. At the free end of the draw rod is secured a sprocket chain 254 which passes over a sprocket 255 on a shaft 256, which shaft 256 extends transversely of the machine. The free end of the chain 254 carries a counterweight 257. Keyed to the shaft 256 are sprockets 258. A second shaft 259 is parallel to the shaft 256 and carries sprockets similar to the sprockets 258. Chains 260 pass around the sprockets 258 and the sprockets on the shaft 259. The carriage 220 is connected to a link in each of these chains by means of lugs 260'.

The mechanism just described operates as follows: rotation of the cam 250 rocks the lever 251 which pulls the rod 253 and accordingly through the chain 254 rotates the shaft 256 in a counter-clockwise direction as viewed in Fig. 19. The rotation of this shaft advances the chains 260 drawing the carriage 220 to the right. The counterweight 257 acts to return the carriage, meanwhile maintaining the follower on the rod 251 in contact with the cam 250 which controls the movement of the carriage.

It will be obvious that one complete traverse of the sewing head carriage 220 occurs at each revolution of the shaft 15 and of course at each revolution of the shaft N. The action of the sewing head is therefore cyclically synchronized with the action of the other operating stations, and the configuration of the periphery of the cam 250 is made such that the movement of the carriage 220 to the right (during which time the sewing head 234 traverses and stitches the stationary bag) is uniform straight-line motion, while on the reverse stroke (the bag now moving on the conveyor B) the movement of the carriage 220 is exactly synchronized with the sinusoidal movement of the conveyor B.

The sewing head 234 is pivoted at points 270 and 271 to lugs 271a and 271b depending from the carriage 220. Preferably, but not necessarily, the axis of the pivots 270 and 271 passes through or substantially through the center of gravity of the head 234, which is free to rock about this axis. The sewing head 234 is biased toward a vertical position by any convenient means, such for example as a spring 271c located between one side of the head 234 and an extension 271d of the lug 271b, and is prevented from turning past this position by a stop 271e attached to the lugs 271a and 271b on the other side of the head 234. As the head traverses the bag its needle 272 will from time to time enter the material of the bag and since this material is rigidly held by the clamping belts 250 the needle may not move relatively to the material while in engagement therewith.

The carriage 220, however, is continuously moving. My construction permits the sewing head 234 to rock about the axis of its pivots 270 and 271 until the needle in the sewing action is withdrawn from the material, at which time the head 234 returns once more into a vertical position.

It will be understood by those familiar with the art that the sewing head is provided with suitable feeding mechanism, such as a feed dog 280, cooperating with a presser foot 281, to advance the material to be sewed through the head in intermittent forward motions, the length of which determines the stitch spacing. The insertions of the needle 272 through the material occur only during the intervals between the successive forward movements of the material caused by the feed dog 280.

In the present instance, however, the feed dog 280, instead of advancing the material through a stationary sewing head, helps to advance the sewing head along the stationary material to be sewed. The manner of operation may readily be understood from the following exposition.

It has been set forth hereinabove that the sewing head carriage traverses the bag with uniform straight line motion. In a typical instance, the relative speeds of the carriage 220 and the needle 272 of the sewing head 234 may be adjusted to give a stitch spacing of, for example, ¼"; that is to say, the needle 272 enters the material to be sewed at points separated by ¼" spaces. The time which it takes for the needle 272 to enter the material, move forward to its point of deepest penetration, and move back to clear the material, is approximately one-half of the time it requires for carriage to move forward ¼", and during this time that the needle is in engagement with the material being sewed there can, of course, be no relative movement between the material and the presser foot 281. During this period also, the feed dog 280 is out of engagement with the material being sewed, and in the present instance is moving back out of engagement with the material being sewed for the purpose of making a subsequent forward stroke.

Thus at the moment the carriage 220 has progressed ⅛" past a stitching point, the needle 272 is just leaving the material and the feed dog 280 is just taking hold of the material in order to cause relative movement of the material and the sewing head 234. During the next ⅛" movement of the carriage 220 the engagement of the feed dog 280 with the material being sewed causes the sewing head 234 to advance ¼" with respect to the material being sewed, thus returning the sewing head to a vertical position. The needle 272 then again enters the material to make a new stitch and the operation is repeated.

It will thus be seen that the advancement of the sewing head 234 is accomplished in part by means of the feed dog 280 which is a portion of the sewing head mechanism and that the resultant intermittent advancement of the sewing head thereby effected is synchronized with the continuous and uniform advancement of the sewing head carriage 220.

When the sewing head reaches the end of a bag being sewed, the feed dog 280 is ineffective to change the position of the sewing head, due to the fact that it is no longer in engagement with material to be sewed. At this time the spring 271c returns the sewing head to the vartical position. The spring 271c also permits the sewing head to yield at the time it engages the top of a new bag whenver this engagement occurs at such time that the feeding mechanism is not quite ready to receive the bag and this serves to prevent the sewing head 234 from crumpling or bending the top of the bag, which it might otherwise do.

This action accomplishes a step-by-step motion of the sewing head with a minimum of inertia effect. This yielding mounting of the sewing head just described is an extremely important feature of my invention and is of utility whether the head moves across a stationary bag as in the present instance or whether the pivots 270 and 271 are held stationary while a bag is moved through the head.

*Tape-applying mechanism*

When a bag is stitched, the holes in the paper made by the passage of the needle may permit a sifting of pulverulent material. Moreover, the paper edges at the closed mouth are sharp and stiff and may present a considerable danger to the hands of anyone handling the bags. To overcome these difficulties it is essential that the paper edges as well as the stitching be covered and that the covering prevent sifting of material out of the bag. This is accomplished by the application of pasted tape over the mouth of the bag and the mechanism for doing this is particularly shown in Figs. 20, 21, 22 and 22a.

The bags brought forward on the conveyor B from the sewing head just described are joined together by a chain of stitches. As the bags leave the grip of the belts 200 they enter between a pair of opposed belts 300 (Fig. 22a) which will carry the bags through the tape squeezing device.

There is a space in which the bag is free from either of the belts 200 or the belts 300 and it is in this space that the pasted tape is applied to the bag mouth. A standard 301 is secured to the machine frame and carries a roll of tape 302. The tape is fed over pulleys 303 past a paste applying device 304, over another pulley 303' and through a guide 305. The guide 305 is shaped to bring the tape from its flat condition into an inverted U shape adapted to cover the mouth of the bag.

The bags move forward with their sewed mouths passing through the tape guide 305. The tape, having been coated with paste, adheres to the bag and is drawn from the reel as the bag progresses. As the bag with the tape applied leaves the guide 305 it comes into the grip of the belts 300, which serve to retain the tape in position and to assist in drawing tape from the reel 302. The belts 300 are driven in synchronism with the movement of the conveyor B.

Tape-squeezing mechanism

After the tape is applied to the mouth of the bag as just described, it is necessary to press it firmly in place to insure permanent adhesion. The belts 300 exert only a moderate pressure upon the tape. They serve, as above desscribed, to assist in drawing the tape from the reel 302 and through the applying plate 305. Preferably, two stations L and L' are provided for squeezing the tape. These stations are identical and as many such stations may be provided as are necessary to secure complete and permanent adhesion of the tape to the bag. A description of one such station will suffice.

The details are shown in Figs. 2, 23 to 26 inclusive, 31 and 32. Referring particularly to Fig. 23 the squeezing station L consists of a standard 400 mounted on the machine frame. A pair of arms 401 and 402 are pivoted at their upper ends to the standard 400 on a shaft 403. The arms 401 and 402 terminate at their lower extremities in pressure plates 404 and 405. The belts 300 run between these pressure plates and grip the sack mouth with the tape applied thereto to carry and guide it between the pressure plates. Pivoted to the arm 401 at an intermediate point 406 is an arm 407. Pivoted to the arm 402 at a point 408 in same horizontal plane as the previously referred to pivot point 406 is a bent lever 409. The opposite end of the arm 407 is pivoted to the lever 409 at a point 410. A bracket 411 is secured to the standard 400 and carries a bar 412 which extends between the arms 401 and 402. The effect of this mechanism is as follows:

Downward pressure exerted on the free end of the lever 409 tends through the arm 407 to rock the arm 401 to the right as viewed in Fig. 23. Such movement is limited by the contact of the arm 401 with the bar 412. Further downward rocking movement of the lever 409 results in rocking the arm 407 about its pivot 406. As seen in the figure this tends to thrust the pivot 410 with the lever 409 leftwardly from the arm 401, hence drawing the arm 402 in the same direction as viewed in Fig. 23. As a result a very heavy pressure is exerted upon the taped bag mouth. The lever 409 is pulled downwardly by means of a rod 413 pivoted at the free end of the lever. The rod 413 is actuated by a path cam 414 on the shaft N. The cam 414 is so constituted to produce a positive return movement of the rod 413 to release the bag mouth from the grip of the pressure plates 404 and 405.

Cutting mechanism

It will be understood from the above that the bags leave the tape-squeezing stations L and L' joined both by a chain of stitches and the applied tape. It is necessary to sever the tape and the stitches to permit separate handling of the bags. The bags are uniformly spaced and it is desirable that they be severed at the median point of the space between each two successive bags. The tape between the bags engages over and secures the chain of stitches and it is essential that some of the tape remain in engagement with the stitches after the bag is severed to prevent unraveling. The mechanism shown at station M in Fig. 2 and more particularly in Figs. 27 to 30, inclusive, 37 and 38, is designed to cut the tape accurately at the desired point.

Referring particularly to Figs. 27 to 30, the cutting mechanism consists of a standard 500 mounted on the main frame of the machine. At the upper end of the standard 500 is journaled a pin 501. Mounted on the pin 501 by means of a pair of bosses 502 is a supporting head 503. The supporting head 503 has pivoted at the lower portion of its right-hand end a pair of levers 504 and 505. The lower ends of these levers have mounted thereon a pair of cutter blades 506 and 507 (Fig. 28). At their upper ends the levers 504 and 505 are pivoted to links 508 and 509 which in turn are pivoted to a lever 510 on opposite sides of its pivot 511 by which it is mounted on the head 503. The upper end of the lever 510 is pivotally attached to a link 512, the opposite end of which is pivoted to one arm of a bell-crank 513, which bell-crank is pivoted at an intermediate point 514 to the head 503. The opposite end 515 of the bell-crank 513 engages a rod 516. Pivotally attached at a point 520 to the head 503 is an arm 521. The arm 521 extends vertically downward from the head 503 and at its lower end is bent horizontally and inwardly to provide a gauge bar 522. The arm 521 has a short extension 523 which is pivoted to a rod 524. The rods 516 and 524 are actuated respectively by cams 517 and 525 on the shaft N (Figs. 37 and 38). The action of the parts just described is as follows:

The conveyor B moves a bag out of the last squeezing station L' and carries it almost to the cutting station M. At this time the end 522 of the lever 521 projects into the path of the bag and is engaged by the bag in the last portion of the movement of the conveyor B. The bag pushes the rod 521 and rocks the head 503 about the pin 501. This positions the blades 506 and 507 which are at this time in their open condition into the correct position for severing the tape between the bags. When the conveyor B comes to rest the cam 517 on the shaft N exerts a downward pull on the rod 516 rocking the bell crank 513 which through the link 512 rocks the lever 510. The rocking movement of the lever 510 acts through links 508 and 509 to press the upper ends of the levers 504 and 505 apart, thus closing the cutter blades 506 and 507 at the lower end of the levers 504 and 505. This severs the tape and stitching between the bags. Continued movement of the cam 517 raises the rod 516 reversing the operations just described and opening the cutter blades. As the blades open the cam 525 acts on the rod 524 to press the arm 523 of the lever 521 upwardly, thus rocking the lever 521 about its pivot 520 and withdrawing the bar 522 from the path of the bag. This occurs just prior to the beginning of a movement of the conveyor B. As the bag moves past the gauge bar 522 the cam 525 acts to permit the return of the bar 522 into the path of the next succeeding bag.

Drive for the belts

The belts 200 and 300 are driven from the shafts 36 (Fig. 3) by means of sprockets 600, one sprocket being mounted on each of the shafts. Chains 601 (Figs. 2 and 3) connect the sprockets 600 with sprockets 602 on stub shafts 603 (Figs. 2 and 22a). On each of the stub shafts 603 is secured a pulley 604 which drives one of the belts 300. Aligned with the pulleys 604 are pulleys 605 mounted on stub shafts 606. Also upon the shafts 606 are pulleys 607 which drive the belts 200 in absolute synchronism with the belts 300 and with the conveyor B.

Support for the upper part of the main belt 30' is provided in a plurality of rollers 610 mounted in longitudinal angles 611 laid on cross members 612, the ends of which are fastened to uprights 613 forming a part of the main frame. The angles 611 also carry bearings 614 in which are journaled the ends of a shaft carrying a pulley 615 for the main belt 30' which pulley 615 is mounted directly opposite to the driven pulley 30.

Where desired, I may provide, as shown in Figs. 1, 7 and 11, additional means for facilitating proper filling of the bag at the filling station A. Such means comprise a pair of plates 620 located on either side of the median line of the position occupied by bag being filled from the spout 51. The plates 620 are mounted on arms 621 keyed to vertical shafts 622 which are conveniently supported in bearings 623 and 624 attached to one of the main frame members. Also keyed to the shaft 622 are a pair of arms 625 through which pass the ends of a horizontal rod 626. Flexible connection between the rod 626 and the arms 625 is provided by means of springs 627 and stops 628. The rod 626 is pivotally attached by means of a clamp 629 to a rod 630 connected at its opposite end to a cam 631 mounted on a shaft 632 driven from any convenient source (not shown).

As the shaft 632 rotates, the cam 631 acting through the rod 630 and the clamp 629 causes the rod 626 to oscillate laterally with respect to the machine, thus alternately swinging the plates 620 against opposite sides of the bag. The lower part of the bag is thus patted by the plates 620 during the filling operation which assists in settling the contents of the bag and preserving the proper shape of the filled bag.

It will be obvious to those skilled in the art that my invention is susceptible of considerable modification in detail without departure therefrom, and my invention is not therefore limited to the specific example or examples given hereinabove by way of illustration, but may variously be embodied within the scope of the claims hereinafter made.

I claim:

1. In combination, a conveyor comprising means to grip the collapsed sides of upright, filled, open-mouth bags above the contents of the bags so that the mouths of the bags project above the conveyor, a sewing head mounted above said conveyor comprising stitching mechanism located in the path of the bag mouths to form a line of stitches closing the bag mouths, tape applying mechanism to which the stitched bag mouths are then presented by said conveyor comprising means to fold a continuous gummed tape longitudinally over the stitched mouths of the bags to seal the mouths and to cover the stitches, said tape extending between adjacent bag mouths, squeezing mechanism to which the bag mouths are next presented by said conveyor comprising means to squeeze the folded tape and the portions of the bag mouths embraced by the tape to cause the tape tightly to adhere to the sides of the bag mouths, a shear to which the bag mouths are subsequently presented by said conveyor, and means to operate said shear to sever the tape extending between bag mouths at a predetermined distance from the trailing edge of each bag presented thereto.

2. In combination, a conveyor comprising means to grip the collapsed sides of upright, filled, open-mouth bags above the contents of the bags so that the mouths of the bags project above the conveyor, a sewing head mounted above said conveyor comprising stitching mechanism intermittently engaging the bag mouths to stitch the projecting mouths of the bags, a pivotal mounting for said sewing head to permit rocking thereof in the direction of travel of the bags in synchronism with the intermittent engagement of the stitching mechanism with the bag mouths during relative movement of the bag mouths and said sewing head, tape applying mechanism to which the stitched bag mouths are then presented by said conveyor comprising means to fold a continuous gummed tape longitudinally over the stitched mouths of the bags to seal the mouths and to cover the stitches, said take extending between adjacent bag mouths, squeezing mechanism to which the bag mouths are next presented by said conveyor comprising means to squeeze the folded tape and the portions of the bag mouths embraced by the tape to cause the tape tightly to adhere to the sides of the bag mouths, a shear to which the bag mouths are subsequently presented by said conveyor, and means to operate said shear to sever the tape extending between the bag mouths at a predetermined distance from the trailing edge of each bag presented thereto.

3. In combination, a conveyor, means for collapsing the mouth of an upright, filled bag on said conveyor, a pair of gripping belts to receive the collapsed mouth of such a bag, a carriage reciprocable parallel to the conveyor, means on said carriage for sewing the mouth of a bag while gripped between said belts, clamping means synchronized with said collapsing means for holding the bag mouth in collapsed position and means on said carriage engaging said clamping means to cause said clamping means to travel with the bag on the conveyor and deliver the collapsed mouth into the grip of said belts.

4. In combination, a conveyor comprising means rigidly to align the mouths of a series of upright, filled, open-mouth bags and to advance said bags intermittently in a series of advancing movements of substantially sinusoidal character, a sewing machine carriage lying in the path of said bags having a sewing machine yieldably pivoted thereon, means for causing said carriage to traverse one of said bags in uniform straight line motion during each interval between two successive forward movements of said bags, said sewing machine being operated to close the bag by uniformly spaced stitches and being caused to rock about its mounting during each stitching operation, and means for drawing said carriage forward during each advancing movement of said bags in synchronism with the movement of said conveyor and said bags.

5. In combination, a conveyor adapted to progress a series of upright, filled, open-mouth bags intermittently in a series of advancing movements of substantially sinusoidal character, a sewing machine carriage lying in the path of said bags, means for causing said carriage to traverse one of said bags in uniform straight line motion during each interval between two successive forward movements of said bags, and means for drawing said carriage forward during each advancing movement of said bags in synchronism with the movement of said conveyor and said bags, a pair of belts moving in synchronism with said conveyor for gripping said bags during the passage of said bags through the sewing station, and a gripping device moving with said carriage for delivering the bags into the grip of said belts.

6. In combination, a conveyor, means for collapsing and forming gussets in the mouth of an upright, filled bag on said conveyor, said means being immovable in the direction of travel of said conveyor, a pair of gripping belts parallel to and movable with said conveyor receiving the mouth of such a bag when collapsed and gusseted, clamping means synchronized with said collapsing and gusseting means for holding the bag mouth in collapsed and gusseted condition, mechanism for causing said clamping means to travel with said bag as it moves on said conveyor until it reaches the grip of said gripping belts, and means adjacent said gripping belts for securing the mouth of said bag in collapsed and gusseted condition.

7. In combination, means rigidly gripping the collapsed upper portion of a filled bag to be sewed with the mouth of said bag projecting therefrom, a sewing head comprising stitching mechanism intermittently engageable with said bag mouth to form stitches therein, a pivot supporting said sewing head extending substantially transversely to the collapsed bag mouth in order that said sewing head may rock in the direction of the bag mouth, flexible means tending to retain said sewing head in a fixed position, and means for producing relative traversing movement between said sewing head and said bag in the direction of the bag mouth during operation of said sewing head whereby said head is caused to rock about said axis at each engagement of said stitching mechanism with the bag mouth.

8. In combination, an intermittently movable conveyor for supporting a filled-open mouth bag in upright position, means associated with and movable with said conveyor for gripping the mouth of said bag above the contents thereof so that the mouth of the bag is maintained in a straight line and projecting above said means, a sewing head mounted above said conveyor and comprising stitching mechanism located in the path of the bag mouth, a pivotal mounting for said sewing head, means for moving said sewing head along the mouth of a bag supported in said conveyor while said conveyor and gripping means are stationary, means to actuate said stitching mechanism to close the mouth of the bag during such movement, said mounting permitting rocking of said sewing head at each engagement of said stitching mechanism with the bag mouth.

9. In combination, a conveyor to progress a series of upright, filled, open-mouth bags, means associated with and movable with said conveyor for gripping the mouths of said bags and maintaining the mouths in line with the conveyor, said means engaging the sides of the bags above the contents thereof so that the bag mouths project above said means, a sewing head yieldably mounted above said conveyor and comprising stitching mechanism located in line with the bag mouths, and means for operating said sewing head to cause said stitching mechanism intermittently to engage said bag mouths and form stitches therein during relative movement of said sewing head and said conveyor.

10. In combination, a conveyor adapted to progress a series of upright, filled, open-mouth bags, means associated with and movable with said conveyor for maintaining the mouths of the bags in collapsed condition in line with the conveyor, a sewing head rockably mounted above said conveyor and comprising stitching mechanism located in the path of the bag mouths, and means for driving said sewing head to cause said stitching mechanism intermittently to engage the bag mouths and form stitches therein during relative movement of said sewing head and said conveyor.

11. In combination, a conveyor adapted to progress a series of upright, filled, open-mouth bags, means associated with and movable with the conveyor to grip the collapsed sides of said bags above the contents thereof so that their mouths project above said means, a sewing head mounted above said conveyor and comprising stitching mechanism located in the path of said bag mouths, a pivot upon which said sewing head is mounted extending substantially at right angles to the bag mouths and passing substantially through the center of gravity of said sewing head, and means for driving said sewing head to cause intermittent engagement of said stitching mechanism with the bag mouths at each stitch-forming operation thereof during relative movement of said sewing head and said conveyor, said pivot permitting rocking of said sewing head at each engagement of said stitching mechanism therewith.

12. In combination, a conveyor to progress a series of upright, filled, open-mouth bags, means associated with and movable with said conveyor for gripping the mouths of said bags and maintaining the mouths in line with the conveyor, said means engaging the sides of the bags above the contents thereof so that the bag mouths project above said means, a sewing head yieldably mounted above said conveyor and comprising stitching mechanism located in line with the bag mouths, said stitching mechanism including a needle and a feed dog, and means for operating said stitching mechanism to cause said needle intermittently to engage said bag mouths during relative movement of said sewing head and said conveyor whereby the sewing head is caused to move from normal position, and upon retraction of said needle to cause said feed dog to engage the bag mouths whereby said sewing head is mechanically aided to return to normal position.

13. In combination, a conveyor adapted to progress a series of bags in intermittent stages through a plurality of stations, a tape-applying device comprising means to fold a tape over the upper ends of the bags located in the path of the upper portions of said bags at one of said stations, a squeezing device comprising means to squeeze the taped upper ends of the bags located at a subsequent station, and means for operating said squeezing device in the intervals between successive movements of said bags.

14. In combination, a conveyor comprising means to grip and successively to present the mouths of a series of upright, filled, open-mouth bags to a plurality of stations in proper position to be operated upon at each station, a sewing head comprising stitching mechanism to stitch the mouths of the bags during relative movement of said sewing head and said bags, said sewing head being located at one of said stations, a tape applying device comprising means to apply a continuous gummed tape over the stitched ends of the bags during relative movement of said bags and said device, said tape applying device being located in the path of the bags leaving said sewing head, a shear located at one of said stations subsequent to said tape applying device, and means for actuating said shear to sever the stitches and tape adjoining the tape and stitched bag mouths at a predetermined distance from the trailing edge of each bag on said conveyor.

15. In combination, a conveyor adapted to progress a series of bags in intermittent stages through a plurality of stations, a closing device located at one of said stations, a sewing machine located at a still subsequent station, a pair of gripping belts for holding the mouths of the bags traversing the sewing machine station, and a reciprocable gripping device movable in synchronism with successive forward movements of said conveyor for maintaining the bags in a closed condition during their progress from said closing device into the grip of said belts.

16. In combination, a conveyor adapted to progress a series of bags through a plurality of stations having means located therein for successively filling and sealing said bags, a driven shaft, a conveyor shaft and an arm mounted on said driven shaft and connected to said conveyor shaft through a ratchet device whereby rotation of said arm through one half of its complete arc causes said conveyor shaft to rotate and advance said conveyor with sinusoidal acceleration and deceleration, while rotation of said arm through the remaining half of its complete arc does not produce rotation of said conveyor shaft.

17. In combination, a conveyor adapted to progress a series of bags through a plurality of stations having means located therein for successively filling and sealing said bags, a drive shaft running at constant speed, an intermediate shaft, a conveyor shaft, an arm mounted on said intermediate shaft and connected to said conveyor shaft through a ratchet device whereby rotation of said arm through one half of its complete arc causes said conveyor shaft to rotate and advance said conveyor with sinusoidal acceleration and deceleration while rotation of said arm through the remaining half of its complete arc does not produce rotation of said conveyor shaft, and a lost motion device located between said drive shaft and said intermediate shaft and adapted to bring said intermediate shaft and said conveyor shaft to rest during a portion of the time consumed by each rotation of said drive shaft.

18. In combination, a conveyor adapted to progress a series of upright, filled, open-mouth bags, said conveyor having means associated therewith to bring the mouths of said bags into a single plane extending in the direction of said conveyor and means to hold the bag mouths in such position, a sewing machine mounted in the path of said bag mouths and having a yieldable mounting whereby stitches may be formed during relative movement of said bags and said sewing machine, and means for driving said sewing machine during relative movement of said sewing machine and said conveyor.

19. In a machine for filling and closing open-mouth bags; means for conveying the filled bags in series, a sewing machine pivotally mounted in the path of the conveyed bags, said sewing machine being so mounted as to be capable of reciprocatory, rocking motion in the direction of the conveyor path, and means on said conveyor for rigidly holding the bag mouths closed and in line with said sewing machine.

20. In a machine for filling and closing open-mouth bags; means for conveying the filled bags in series, a sewing machine pivotally mounted in the path of the conveyed bags, said sewing machine being so mounted as to be capable of reciprocatory, rocking motion in the direction of the conveyor path, means whereby such reciprocatory motion is synchronized with the sewing action of the machine, and means on said conveyor for rigidly holding the bag mouths closed and in line with said sewing machine.

21. In a machine for filling and closing open-mouth bags; means for conveying the filled bags in series, a sewing machine pivotally mounted in the path of the conveyed bags, said sewing machine being so mounted as to be capable of reciprocatory, rocking motion in the direction of the conveyor paths, means on said conveyor for rigidly holding the bag mouths closed and in line with said sewing machine, and means for producing relative movement between each of said bags and the sewing machine mounting during the operation of the sewing machine to close the bag.

22. In a machine for closing open-mouthed filled bags; means for conveying the filled bags in series, a sewing machine mounted in the path of the conveyed bags, said sewing machine being so mounted as to be capable of reciprocatory motion of stitch-length extent in the direction of the conveyor path during relative movement of said conveyor and said sewing machine, and means on said conveyor for rigidly holding the bag mouths closed.

23. In a machine for closing open-mouthed filled bags; means for conveying the filled bags in series, a sewing machine mounted in the path of the conveyed bags, said sewing machine being so mounted as to be capable of reciprocatory motion of stitch-length extent in the direction of the conveyor path during relative movement of said conveyor and said sewing machine, means whereby such reciprocatory motion is synchronized with the sewing action of the machine, and means on said conveyor for rigidly holding the bag mouths closed.

24. In a filled bag closing machine, means for bringing the lips of a bag into the relationship in which they are to be closed, bag feeding means including a pair of belts arranged to grip the sides of the bag above the contents thereof but below the mouth in order that the mouth may project therethrough, and means to close the bag including stitching mechanism and means for reciprocating said stitching mechanism lengthwise of the lips of the bag in stitch-length strokes so as to permit the operation thereof during relative movement of the bag and said closing means the length of the bag lips.

25. In a filled bag closing machine, means for bringing the lips of a bag into the relationship in which they are to be closed, bag feeding means including a pair of belts arranged to grip the sides of the bag above the contents thereof but below the mouth in order that the mouth may project therethrough, and means for closing the bag including stitching mechanism and means for reciprocating said stitching mechanism lengthwise of the lips of the bag in short strokes so as to bring said stitching mechanism into proper relation with the bag at successive points commensurate with evenly spaced stitches during relative movement of the bag and said closing means the length of the bag lips.

26. In a filled bag closing machine, means for bringing the lips of a bag into the relationship in which they are to be closed, bag feeding means including a pair of belts arranged to grip the sides of the bag above the contents thereof but below the mouth in order that the mouth may project therethrough, and means for closing the bag including stitching mechanism and means for oscillating said stitching mechanism lengthwise of the lips of the bag in strokes commensurate with evenly spaced stitching so as to allow simultaneous relative movement of the bag and said closing means during the closing action.

27. In a filled bag closing machine, means for holding the lips of a bag in the relationship to which they are to be closed, bag feeding means including a pair of belts arranged to grip the sides of the bag above the contents thereof but below the mouth in order that the mouth may project therethrough, means to close the bag including stitching mechanism and means for reciprocating said stitching mechanism lengthwise of the lips of the bag in stitch-length strokes so as to permit the operation thereof during relative movement of the bag and said closing means, and means for causing simultaneous relative movement of said closing means and the bag.

28. In a filled bag closing machine, means for holding the lips of a bag in the relationship in which they are to be closed, bag feeding means including a pair of belts arranged to grip the sides of the bag above the contents thereof but below the mouth in order that the mouth may project therethrough, means to close the bag including stitching mechanism and means for reciprocating said stitching mechanism lengthwise of the lips of the bag in short strokes so as to bring said stitching mechanism into proper relation with the bag at successive points commensurate with evenly spaced stitches during relative movement of the bag and said closing means, and means for causing simultaneous relative movement of said closing means and the bag.

29. In a filled bag closing machine, means for holding the lips of a bag in the relationship in which they are to be closed, bag feeding means including a pair of belts arranged to grip the sides of the bag above the contents thereof but below the mouth in order that the mouth may project therethrough, means for closing the bag including stitching mechanism and means for oscillating said stitching mechanism lengthwise of the lips of the bag in strokes commensurate with evenly spaced stitching so as to allow relative movement of the bag and said closing means during the closing action, and means for causing simultaneous relative movement of said closing means and the bag.

30. In a filled bag closing machine, a sewing head mounted in the path of the bags, a conveyor and means to operate said conveyor intermittently to advance the bags into proper relationship with said sewing head in movements of sinusoidal acceleration and deceleration, the periods of movement being of shorter duration than the intervening periods of rest, means for causing said sewing head to traverse the bags in uniform movement during the periods of rest in order to close the bags, and means for returning the sewing head to its starting position during the periods of movement in movements of sinusoidal acceleration and deceleration synchronized with said conveyor.

31. In combination, a conveyor comprising means to advance upright, filled, open-mouth bags with their mouths maintained in line with said conveyor, pivotally mounted means for sewing the mouths of filled bags carried by said conveyor, means for applying a tape longitudinally over the sewed mouths to cover the mouths and protect the same, means for applying squeezing pressure to said tape and the portion of the bag mouths embraced thereby, and means for severing the stitches and tape between bags.

ROBERT N. CUNDALL.